US009282699B2

(12) United States Patent
Anderson et al.

(10) Patent No.: US 9,282,699 B2
(45) Date of Patent: *Mar. 15, 2016

(54) IRRIGATION SYSTEM

(71) Applicant: Living Greens Farm, Inc., Prior Lake, MN (US)

(72) Inventors: Dana Anderson, Prior Lake, MN (US); Allen James, Cottage Grove, MN (US); Michael Gramse, Faribault, MN (US)

(73) Assignee: LIVING GREENS FARM, INC., Faribault, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/321,320

(22) Filed: Jul. 1, 2014

(65) Prior Publication Data

US 2014/0311030 A1    Oct. 23, 2014

Related U.S. Application Data

(63) Continuation of application No. 14/114,199, filed as application No. PCT/US2013/032492 on Mar. 15, 2013.

(60) Provisional application No. 61/657,203, filed on Jun. 8, 2012.

(51) Int. Cl.
*A01G 25/09* (2006.01)
*A01G 9/24* (2006.01)
(Continued)

(52) U.S. Cl.
CPC *A01G 25/09* (2013.01); *A01G 9/02* (2013.01); *A01G 9/247* (2013.01); *A01G 25/097* (2013.01); *A01G 29/00* (2013.01); *A01G 31/02* (2013.01)

(58) Field of Classification Search
CPC ..... A01G 25/00; A01G 25/09; A01G 25/097; A01G 25/16; A01G 27/00; A01G 29/00
USPC ................................................ 47/48.5, 79
See application file for complete search history.

(56) References Cited

U.S. PATENT DOCUMENTS

| 3,181,273 A | 5/1965 | West et al. |
| 3,686,792 A * | 8/1972 | Barfield ............................ 47/39 |

(Continued)

FOREIGN PATENT DOCUMENTS

| JP | 07034696 B2 | 4/1995 |
| JP | 07327520 A | 12/1995 |

OTHER PUBLICATIONS

LGF-P1002-PCT Search Report Written Opinion for PCT/US2013/045003, dated Oct. 28, 2013.

(Continued)

*Primary Examiner* — David Parsley
(74) *Attorney, Agent, or Firm* — Hamilton IP Law, PC; Jay R. Hamilton; Charles A. Damschen

(57) ABSTRACT

An irrigation system that includes a carriage may move along a predetermined path in a reciprocal manner. The carriage supports one or more exit ports that are fed plant growth material by a pressurized delivery arrangement. One or more plant stands are configured and arranged to straddle the carriage as it moves along the predetermined path. The one or more plant stands form a chamber into which plant roots may extend, and into which the one or more exit ports are able to discharge their plant growth material. The one or more plant stands may include side panels and a cap to reduce infiltration of light and contaminants, and to enhance the plant root-plant growth material interface and absorption rates. The carriage and/or the plant stand(s) may include friction reducing elements that facilitate transverse movement. The carriage and/or the plant stand(s) may be supported by a modular framework.

20 Claims, 17 Drawing Sheets

(51) Int. Cl.
*A01G 29/00* (2006.01)
*A01G 31/02* (2006.01)
*A01G 9/02* (2006.01)

(56) References Cited

U.S. PATENT DOCUMENTS

| | | | |
|---|---|---|---|
| 3,708,009 A | 1/1973 | Viol et al. | |
| 3,729,016 A * | 4/1973 | Von Linsowe | 239/736 |
| 3,729,141 A * | 4/1973 | Cornelius | 239/738 |
| 3,749,319 A * | 7/1973 | Fischer | 239/318 |
| 3,874,721 A | 4/1975 | Tuggle | |
| 3,888,041 A | 6/1975 | Bundy et al. | |
| 4,006,559 A | 2/1977 | Carlyon, Jr. | |
| 4,035,950 A | 7/1977 | Anselm | |
| 4,047,327 A | 9/1977 | Tescher | |
| 4,059,922 A | 11/1977 | Digiacinto | |
| 4,099,669 A * | 7/1978 | Cortopassi | 239/1 |
| 4,244,145 A | 1/1981 | Polacsek | |
| 4,295,607 A * | 10/1981 | Noble | 239/1 |
| 4,309,844 A | 1/1982 | King et al. | |
| 4,332,105 A | 6/1982 | Nir | |
| 4,352,460 A * | 10/1982 | Purtell | 239/1 |
| 4,419,843 A | 12/1983 | Johnson, Sr. | |
| 4,505,068 A | 3/1985 | Kaneko | |
| 4,569,150 A | 2/1986 | Carlson et al. | |
| 4,584,791 A | 4/1986 | Wolf | |
| 4,603,077 A | 7/1986 | Fujimoto et al. | |
| 4,658,878 A | 4/1987 | Williams | |
| 4,713,909 A | 12/1987 | Roper et al. | |
| 4,813,176 A | 3/1989 | Takayasu | |
| 4,844,109 A | 7/1989 | Navarro | |
| 4,869,019 A | 9/1989 | Ehrlich | |
| 4,924,623 A | 5/1990 | van Rens | |
| 4,965,962 A | 10/1990 | Akagi | |
| 4,982,526 A | 1/1991 | Miyachi | |
| 5,042,196 A | 8/1991 | Lukawski | |
| 5,076,008 A | 12/1991 | Arroyo | |
| 5,077,935 A | 1/1992 | Stoever et al. | |
| 5,226,255 A | 7/1993 | Robertson | |
| 5,317,834 A | 6/1994 | Anderson | |
| 5,397,056 A * | 3/1995 | Sakatani et al. | 239/173 |
| 5,417,010 A | 5/1995 | Ecer | |
| 5,435,098 A | 7/1995 | Koide et al. | |
| 5,560,415 A | 10/1996 | Geissler | |
| 5,724,768 A | 3/1998 | Ammann | |
| 5,862,628 A | 1/1999 | Takashima | |
| 5,918,416 A | 7/1999 | Ammann | |
| 5,937,575 A | 8/1999 | Zobel et al. | |
| 6,006,471 A | 12/1999 | Sun | |
| 6,021,602 A | 2/2000 | Orsi | |
| 6,061,957 A | 5/2000 | Takashima | |
| 6,070,358 A | 6/2000 | Meikle et al. | |
| 6,082,044 A | 7/2000 | Sherfield | |
| 6,105,309 A | 8/2000 | Takayanagi | |
| 6,127,027 A | 10/2000 | Nogami et al. | |
| 6,131,832 A * | 10/2000 | Murphy | 239/726 |
| 6,219,965 B1 | 4/2001 | Ishikawa et al. | |
| 6,237,282 B1 | 5/2001 | Pitts | |
| 6,360,482 B1 | 3/2002 | Boyes | |
| 6,360,483 B1 | 3/2002 | Sherfield | |
| 6,446,386 B1 | 9/2002 | Holloway | |
| 6,508,033 B2 | 1/2003 | Hessel et al. | |
| 6,578,319 B1 | 6/2003 | Cole et al. | |
| 6,615,542 B2 | 9/2003 | Ware | |
| 6,698,668 B2 * | 3/2004 | Stehling | 239/172 |
| 6,729,807 B1 | 5/2004 | Spittle | |
| 6,807,770 B2 | 10/2004 | Wainwright et al. | |
| 6,811,653 B2 | 11/2004 | Huang | |
| 7,426,802 B2 | 9/2008 | Umbaugh | |
| 8,181,391 B1 | 5/2012 | Giacomantonio | |
| 2002/0029517 A1 * | 3/2002 | Hutchinson et al. | 47/39 |
| 2003/0006323 A1 | 1/2003 | Reid | |
| 2003/0089037 A1 | 5/2003 | Ware | |
| 2003/0121362 A1 | 7/2003 | Goellner | |
| 2003/0150160 A1 | 8/2003 | Anderson | |
| 2003/0188477 A1 | 10/2003 | Pasternak et al. | |
| 2006/0032128 A1 | 2/2006 | Bryan | |
| 2006/0053691 A1 | 3/2006 | Harwood et al. | |
| 2008/0295400 A1 | 12/2008 | Harwood et al. | |
| 2011/0146146 A1 | 6/2011 | Harwood | |
| 2011/0258925 A1 | 10/2011 | Baker | |
| 2012/0085026 A1 | 4/2012 | Morris | |

OTHER PUBLICATIONS

LGF-P1004-PCT Search Report and Written Opinion for PCT/US2013/032492, dated May 30, 2013.

* cited by examiner

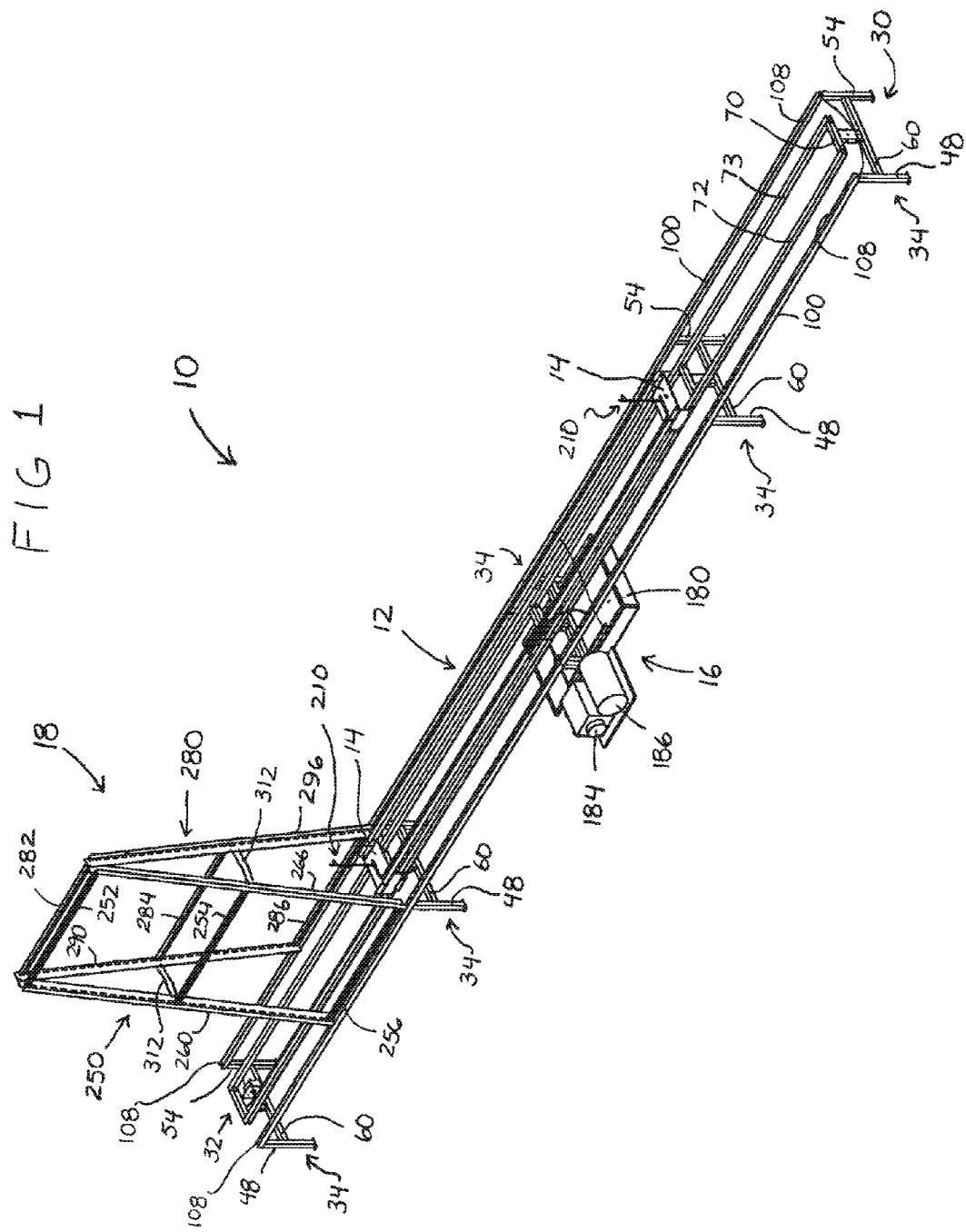

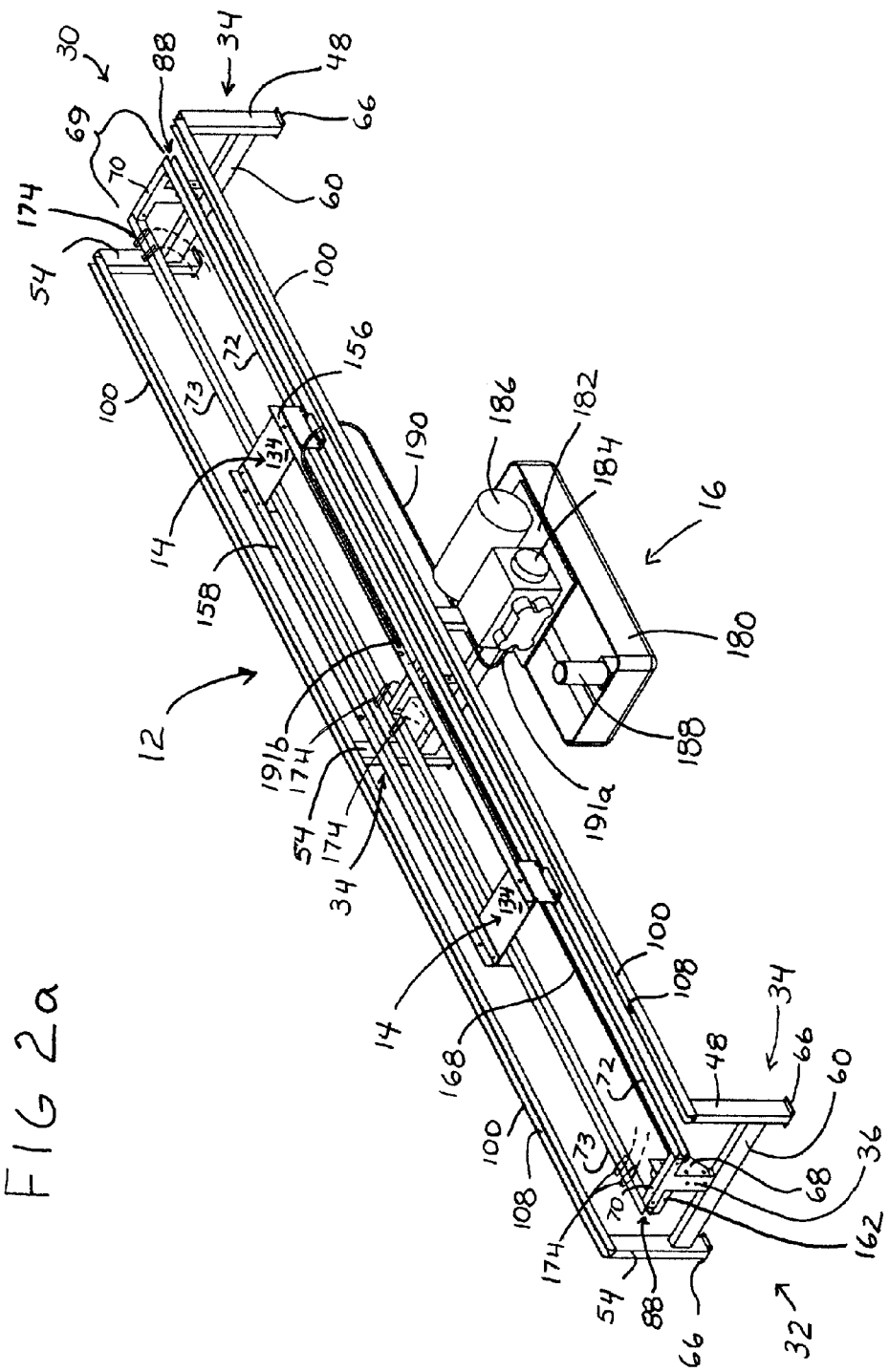

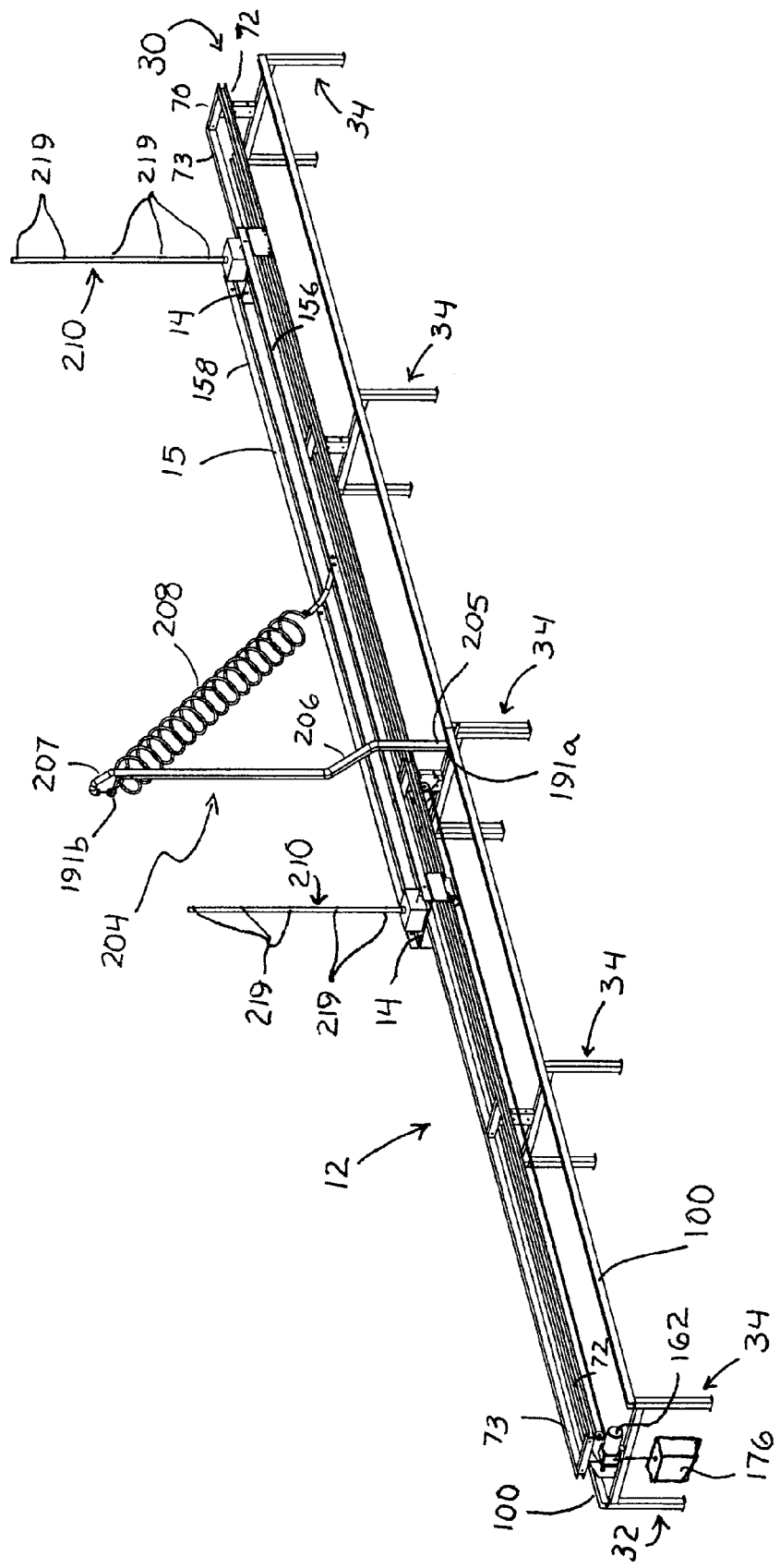

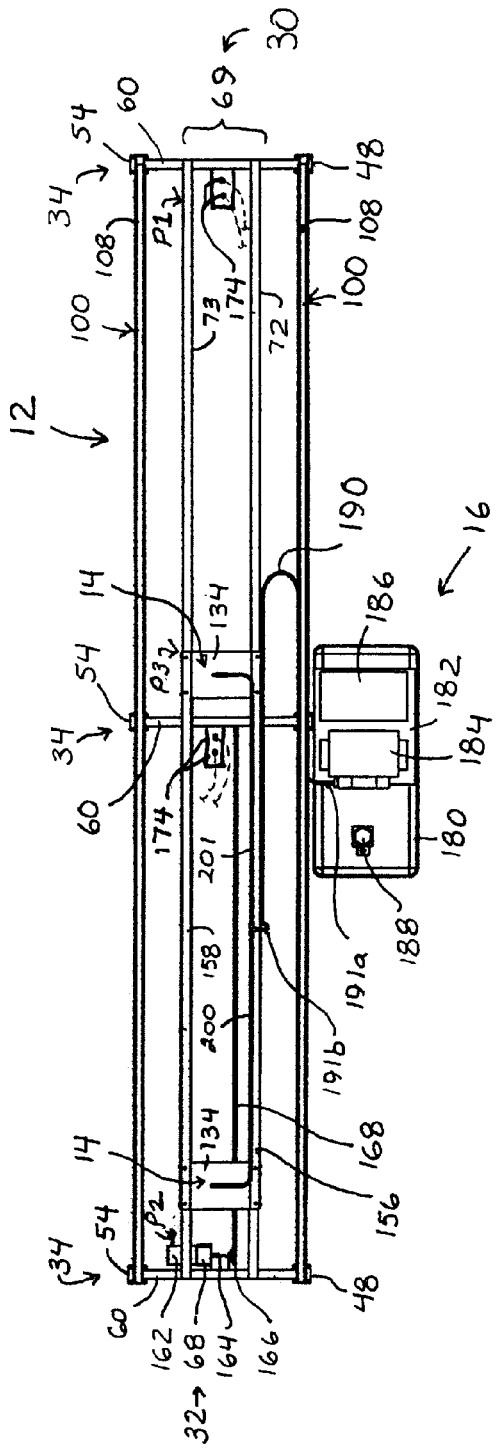
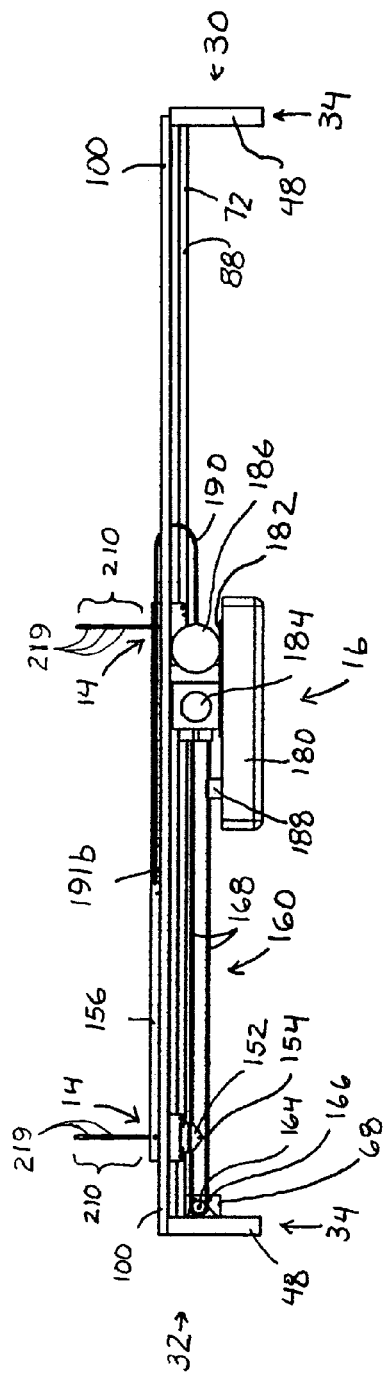
FIG. 3
FIG. 4

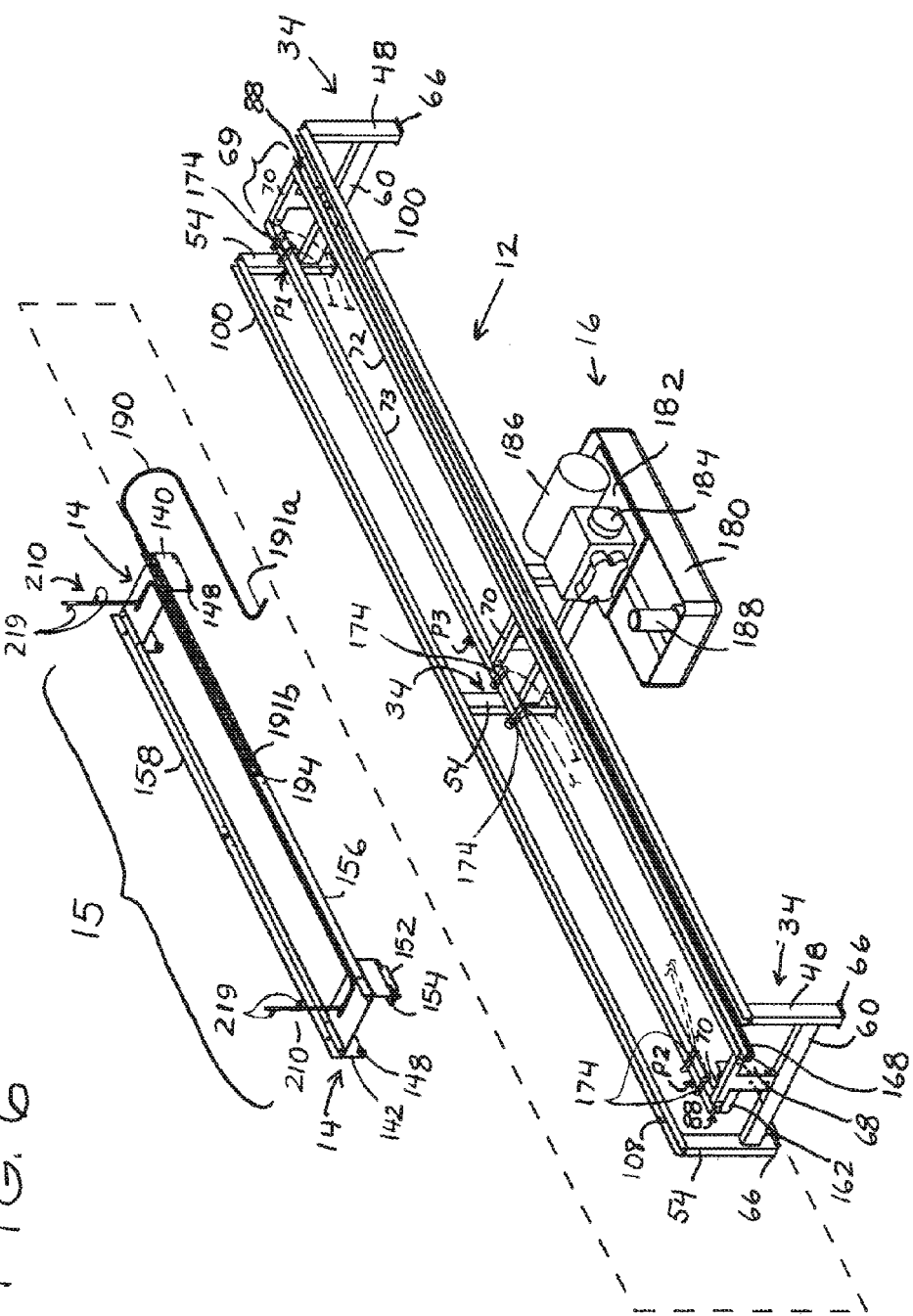

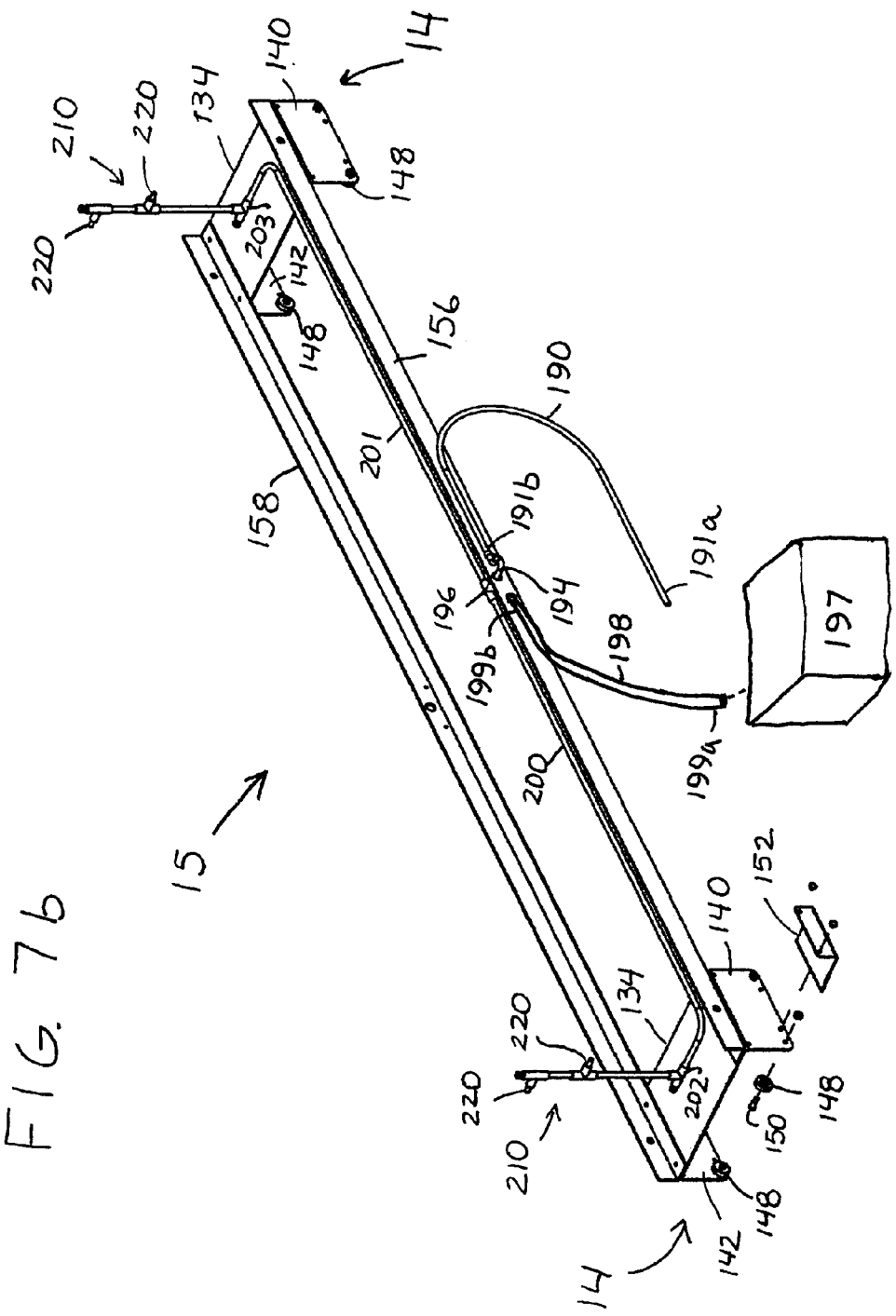

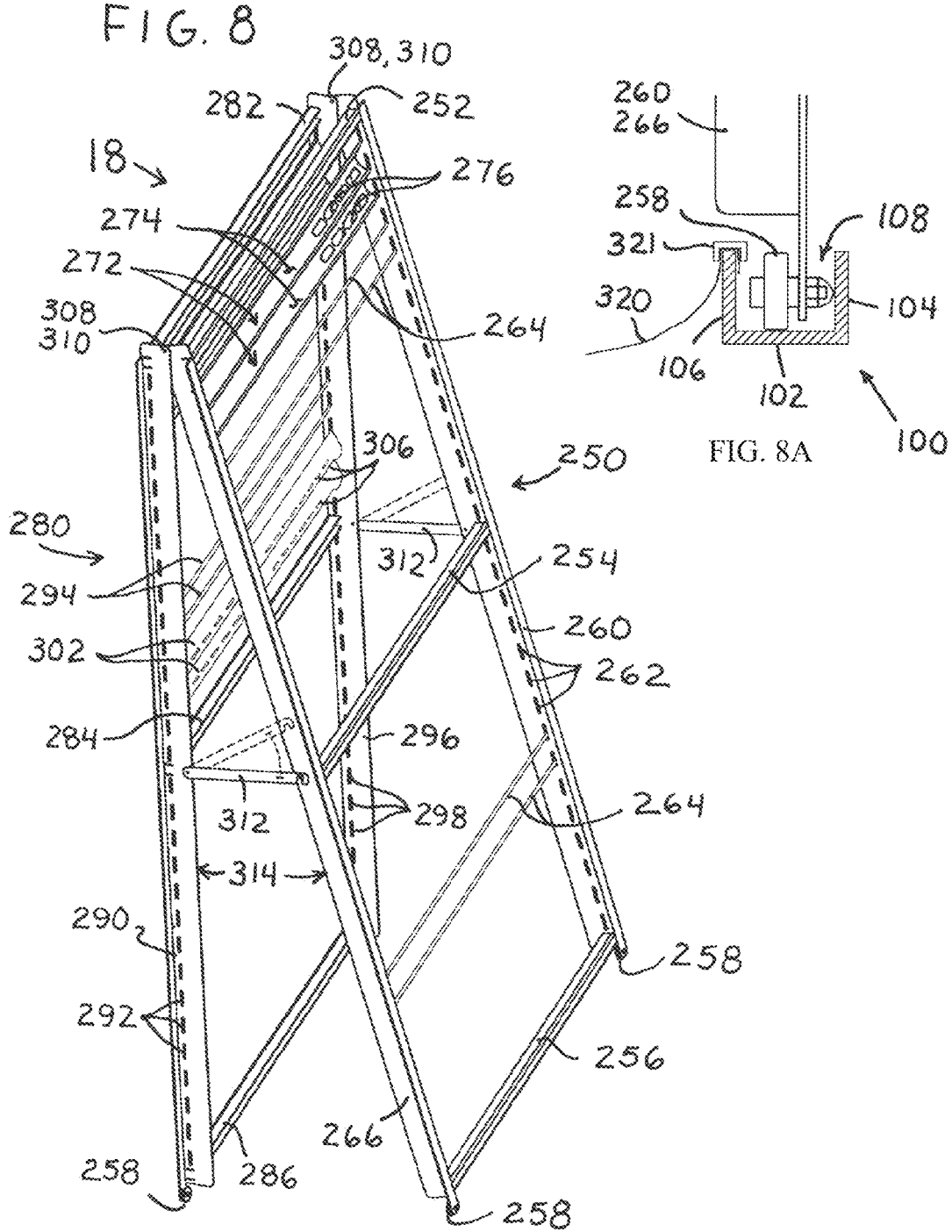

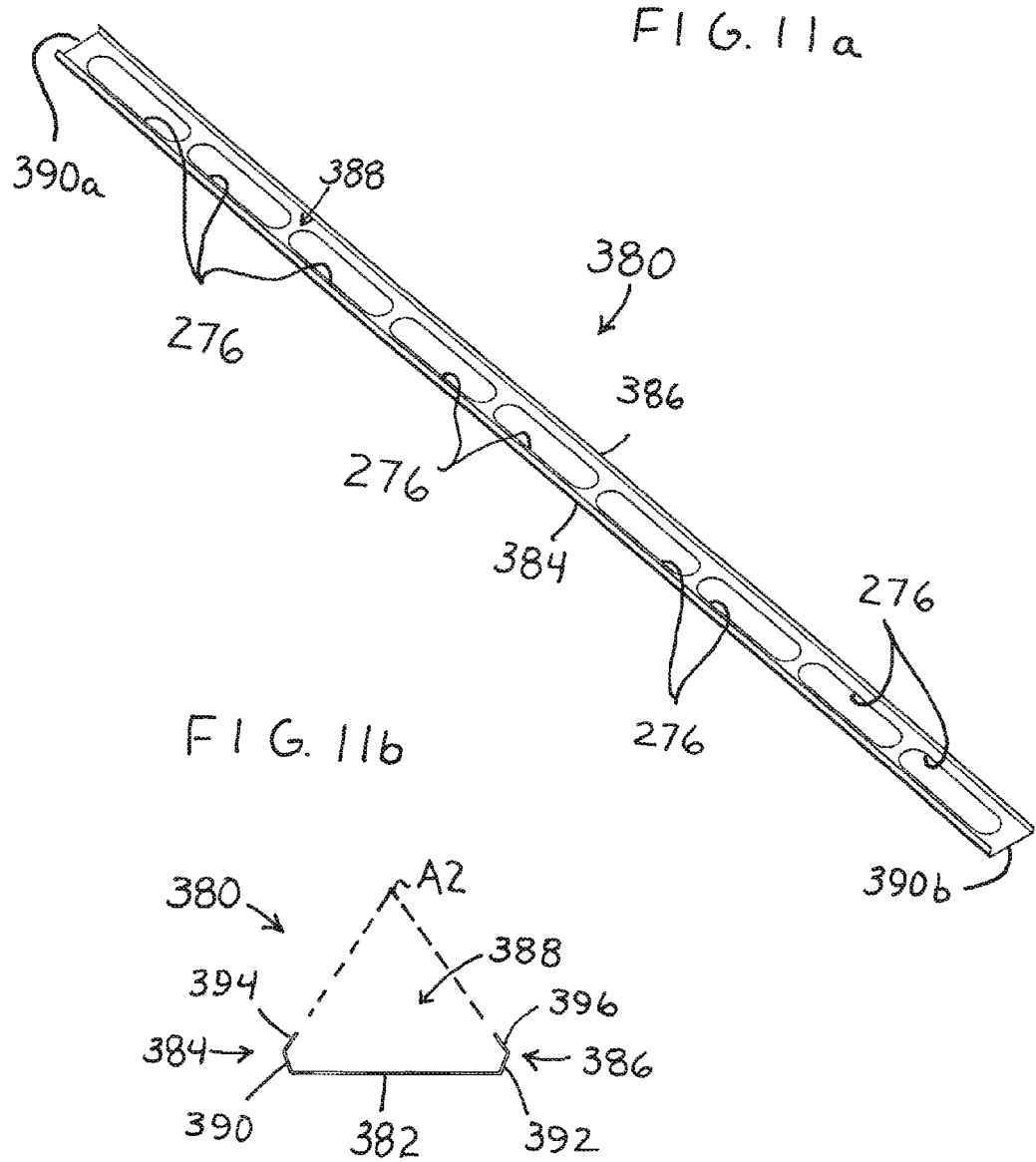

IRRIGATION SYSTEM

CROSS REFERENCE TO RELATED APPLICATIONS

Applicant states that this non-provisional utility patent application is a continuation of U.S. patent Ser. No. 14/114,199 filed on Oct. 25, 2013, which claimed priority from International Patent Application PCT/US2013/032492 filed on Mar. 15, 2013 which claimed priority from provisional U.S. Pat. App. 61/657,203 filed on Jun. 8, 2012, all of which applications are incorporated by reference herein in their entireties.

FIELD OF INVENTION

The present invention relates generally to plant cultivation and, more specifically, to equipment for use in an aeroponic plant growing system.

STATEMENT REGARDING FEDERALLY SPONSORED RESEARCH OR DEVELOPMENT

No federal funds were used to develop or create the invention disclosed and described in the patent application.

REFERENCE TO SEQUENCE LISTING, A TABLE, OR A COMPUTER PROGRAM LISTING COMPACT DISK APPENDIX

Not Applicable

DESCRIPTION OF THE PRIOR ART

Improved methods of administering water and other nutrients to enhance plant growth have been explored since the beginning of modern agriculture. Various means of water and nutrient delivery have been devised from applicators transported by large tractors, to stationary overhead sprinkler systems, to center pivot irrigation system, to the more recent ubiquitous employment of drip hydroponic methods in green houses.

For field crops, an irrigation system that delivers solution to the root zone via percolation benefits the plants in the following beneficial ways. Primarily, it allows nutrients to be delivered in smaller amounts and at lower concentrations, which reduce the chances of root burn, and which the plants are better able to tolerate. In addition, because smaller amounts of nutrients are delivered to the plants, the rates of evaporation and runoff are reduced. The environment benefits because the chances of a field being flooded with excess, highly concentrated chemicals, water and nutrients are substantially reduced and/or avoided. Additionally, the roots will receive the nutrients in more frequent and regular intervals, which is beneficial to overall growth rates.

A common method of applying fertilizers to field crops is through the use of applicators that are transported by large tractors that travel between crop rows. A drawback with such a method is that the tractor usually only makes one application pass along each crop row, this can result in the deposit of high concentrations of fertilizers such as potash and nitrogen onto shoots of the crops and the field, which can later be washed away by rain(s) and/or by supporting irrigation systems. A further drawback is that with existing supporting irrigation systems, water and/or nutrients are usually delivered to the shoots of the crops from which they can then evaporate, but which can often pool and eventually percolate down to an aquifer, which leads to ground water contamination or runoff and combine with existing streams and/or rivers, thus polluting them.

More recently, other methods of irrigation have been developed. They include hydroponics and aeroponics. With hydroponics, plant roots do not grow in a soil medium. Instead, plants are held in frames and roots are submerged in a liquid medium of water and nutrients. The liquid medium is circulated past the roots and in doing so the liquid imparts nutrients and other essential material to the plant. A drawback with such as system is that when plant roots are submerged, they are less able to effectively interact with the atmosphere as they would normally do when they are in a soil growth medium. Another drawback with such as system is that they are expensive to set-up, operate and maintain. Another drawback with such as system is that it horizontally oriented and has a relatively large footprint.

With aeroponics, plant roots do not grow in a either a soil medium or a liquid medium. Instead, plant roots have their nutrients and other essential material delivered in the form of an aerosolized medium. Current prior art aeroponic systems are static and, in their most basic form, usually include a hose that is provided with a plurality of nozzles at spaced intervals along the hose—usually every 12 inches or so, or one nozzle per plant. Often, a plurality of such hoses is connected to a manifold or plenum from which nutrients and other essential material are dispensed. In large operations, there can be dozens of hoses and hundreds of nozzles. In such a prior art operation, roots of each plant are exposed to the aerosolized medium via a nozzle, which is pulsed on and off at fairly regular intervals. To achieve the highest beneficial growth rates in such a system, timers are used to pulse or interval the nutrient solution delivery. A typical on/off pulse ratio can be 1 second on and 1 minute off, but such ratios can have on/off ratios as high as 2 minutes on and 20 minutes off.

A significant drawback of current aeroponic systems is that continued cycling of nozzles allows minerals and other essential material carried by the medium to be deposited on the surfaces of the nozzles and in the nozzle orifices, where they can solidify when the system is cycled off. This is a significant problem because nozzle orifices are quite small. It will be appreciated then, that a thin layer of surface deposition or an un-dissolved particle that is unable to flow through the orifice can alter the operational characteristics and spray pattern produced by the orifice. Over time, the ability of the nozzles to operate as intended is diminished until the nozzles become completely clogged. This can lead to dry spots, incomplete nutrient delivery, stunted growth and ultimately crop failure.

While it is possible to monitor the nozzles to make sure that they are operating correctly, this is labor intensive procedure because each nozzle must be visually inspected. Moreover, if nozzles need to be replaced and/or cleaned, additional labor and cost are required. That is, one or more workers needs to periodically walk the rows and inspect the plant roots to make sure that the system is operating as designed. If there is a problem with one or more nozzles, the system must be shut down, depressurized and the problem(s) rectified. This could be in the nature of removing and cleaning a nozzle or it could be replacement of a nozzle. Moreover, this must be done with some degree of efficiency and rapidity, because while the system is shut down the plants are not receiving any nutrients.

After the problem(s) have been rectified, the system has to be re-pressurized and tested. If the worker has not correctly identified and rectified all nozzle malfunctions, the system will need to be shut down again and the problem(s) rectified before re-pressurization and testing. In current aeroponic systems, which can include hundreds of nozzles spaced at regular intervals along a supply hose, this can be a daunting and expensive and time consuming task that must be repeated on a regular basis.

Another drawback with current aeroponic systems is that the nozzles, which are formed from material such as stainless steel or brass, are difficult to fabricate and this increases manufacturing costs. As will be appreciated, when the number of nozzles used in a system can easily exceed 100 and can go much higher, the initial outlay and subsequent replacement costs for them can be quite expensive.

Another drawback with current aeroponic systems is that they are intended to be permanent structures. Once they are set up, they cannot be easily moved. In addition, their sizes cannot be easily changed. That is, they cannot be enlarged or reduced without significant and costly efforts.

Another drawback with current aeroponic systems is that they lack a tracking system that allows plants and their associated plant trays to be selectively positioned so that they may be exposed to different growth environments that are tailored to the requirements and developmental stages of the plants.

An additional drawback with current aeroponic systems is that they are horizontally oriented and planar, which limits the degree of plant density and ultimately the crop yield that can be achieved per unit measure (e.g. square foot). Such a horizontally oriented system also creates a relatively large footprint. Accordingly, there is a need in the art for aeroponic system that overcomes these and other drawbacks.

SUMMARY

According to the present invention, the forgoing drawbacks are overcome by an irrigation system that may include a carriage that includes a body with a platform with the carriage movable between a first position and a second position in a reciprocal manner. The irrigation system may also include a plant growth material delivery arrangement that has an intake portion and a discharge portion. The discharge portion may be operatively connected to the carriage so that it is able to move therewith as the carriage is moved between the first and second positions. The irrigation system may also include a plant stand. The plant stand may be configured and arranged so that it is able to retain a plant so that a plant root is able to extend downwardly in a conventional manner. The plant stand may be positionable so that the plant root is able to receive growth material from the discharge portion of the delivery arrangement.

In accordance with an aspect of the invention, the plant stand may comprise a first frame having a top member, opposing side members, a plurality of crossbars and a bottom member; and a second frame having a top member, opposing side members, a plurality of crossbars and a bottom member. The first and second frames may be connected to each other adjacent their respective top members so as to form an A-frame configuration, which allows it to be positioned over the discharge portion. The A-frame configuration may be maintained by one or more straps that may be connected to the side members of the first and second frames. Advantageously, the plant stand is provided with one or more horizontally oriented, longitudinal plant holders that may be operatively connected to the crossbars of either one, or both of the first and second frames of the A-frame plant stand. The plant holders allow plants to be arranged and cultivated in tiers or steps. Advantageously, at least one of the frames may be provided with one or more friction reducing elements that allow the plant stand to be moved transversely while it maintains contact with a support surface. Preferably, each frame of the plant stand provided with one or more wheels that rollingly support the plant stand.

In accordance with another aspect of the invention, the irrigation system may include a modular framework. The framework may comprise a first sub-frame having a center post and a second sub-frame having a center post, with the second sub-frame spaced from and generally parallel to the first sub-frame. A guide assembly may be connected to the center posts of the first and second sub-frames. Advantageously, the guide assembly is able to constrainingly engage a carriage while it moves between the first and second positions. Advantageously, the framework includes a third sub-frame. The framework may include a drive assembly that is configured and arranged to engage the carriage and move it between the first and second positions. The framework may include one or more rails that may support a plant stand. Preferably, the guide assembly and the rail(s) are substantially parallel to each other. Preferably, the guide assembly may be oriented horizontally and supported in an elevated position. In accordance with another aspect of the invention, the irrigation system may include a movable support in the form of a carriage. The carriage comprises a body having a platform with first and second surfaces. The carriage also comprises a plurality of struts in the form of a first side wall and a second side wall, with the first and second side walls being substantially parallel with each other. The first and second side walls are oriented so that they are generally orthogonal or perpendicular to a plane defined by the second surface of the platform. Each of the first and second side walls may include at least one friction reducing element in the form of a rotatably mounted wheel that is capable of supporting the carriage as it is moved from the first position to the second position. Preferably, one of the side walls of the carriage is provided with an extension and a connecting element with which to connect the carriage to the drive assembly. Preferably, two carriages are connected to each other by a link to form a carriage assembly.

In accordance with another aspect of the invention, the irrigation system may include a plant growth material delivery arrangement. The delivery arrangement may comprise an intake portion that is stationary and a discharge portion that is movably connected to a carriage or carriage assembly. The intake portion of the delivery arrangement may comprise a reservoir that is in fluidic communication with a pump that is operatively engaged by a motive source. Output from the pump is connected to and in communication with a first end of a supply line. The second end of the supply line supported by a carriage or carriage assembly (as the case may be) and is forms part of the discharge portion of the delivery arrangement. The second end of the supply line may be connected to a trunk that leads to a branch that may include one or more exit ports. Alternatively, the supply line may be connected to two trunks, each of which leading to a branch that may include one or more exit ports. The branch or branches may be attached or connected to a carriage or carriages, so that when the carriage or carriages are moved, the exit ports move with the carriages and the exit ports are able to deliver nutrients and other essential plant growth material to a plant, preferably at its roots. The reservoir may be operatively connected to a recycling arrangement and/or periodically replenished by a main tank.

In accordance with another aspect of the invention, the irrigation system may be operatively connected to a recycling arrangement. The recycling arrangement may comprise a flexible collector that is configured and arranged to receive plant growth material that is not absorbed by plant roots and which condenses or collects on the interior surfaces of a chamber formed by plant holders of a plant stand. A collector may have a width that is greater than a width defined by rails of a framework, and a length that is substantially equal to a length defined by first and second ends of the framework. In use, a collector may be attached to the rails of the framework. The greater width of the collector allows a portion of the collector to be positioned below a carriage or carriage assembly. If the framework rails are horizontal, one end of the collector may be positioned so that it is at a different elevation than the other end of the collector. This enables moisture received by the collector to flow toward the lower positioned end where it can be directed to the reservoir by a conduit or tubing. With framework embodiments that include upwardly opening U-shaped rails, the rails may serve as gutters that also function in a similar manner as the collector. Like the collector, the gutters may be connected to a conduit or tubing that directs excess plant growth material to the reservoir.

An object of the present invention is to provide an irrigation system that is able to apply nutrients and other essential material directly to plant roots in an efficient and cost effective manner.

Another object of the present invention is to maximize the number of plants per square foot that may be cultivated in a given area.

A feature of the present invention is that there are a reduced number of nozzles that are needed to provide nutrients and other essential materials to plants.

Another feature of the present invention is that the system allows groups of plants to be initially positioned and then repositioned during various stages of their growth cycle. Another feature of the present invention is that groups of plants may be grown and processed on a continuous basis.

An advantage of the present invention is that the nozzles operate on a continuous basis and are less prone to clog up due to mineral deposition.

Another advantage of the present invention is that plants/crops are able to be provided with different growth environments that can be tailored to the life cycle requirements of the plants/crops.

Another advantage of the present invention is that groups of plants may be easily handled and transported during their life cycle.

These and other features and objects of the present invention will be more fully described below with reference to the accompanying drawings.

BRIEF DESCRIPTION OF THE DRAWINGS

The accompanying drawings, which are incorporated in and constitute a part of the description, illustrate aspects of the invention and together with the detailed description, serve to explain the principles of the invention. A brief description of the drawings is as follows:

FIG. 1 is a partial, perspective view of an illustrative embodiment of an irrigation system;

FIG. 2a is a partial perspective view of an illustrative embodiment of a framework, a carriage assembly and a portion of a delivery arrangement in an irrigation system;

FIG. 2b is a partial perspective view of another illustrative embodiment of a framework, a carriage assembly and a portion of a delivery arrangement of an irrigation system;

FIG. 3 is a top plan view of the embodiment of FIG. 2a, along with additional portions of the delivery arrangement connected to the carriage assembly;

FIG. 4 is a side elevational view of the embodiment of FIG. 3;

FIG. 6 is a partially exploded perspective view of the embodiment of FIG. 3;

FIG. 7b is a partially exploded perspective view of a carriage assembly of FIG. 6;

FIG. 8A is a detailed view of a portion of the plant stand shown in FIG. 8 engaged with a rail;

FIG. 10b is an edge view of the plant holder of FIG. 10a;

FIG. 10c is a partial, top plan view of a portion of the plant holder of FIG. 10a;

FIG. 11a is a perspective view of an insert that may be used in conjunction with the plant holder of FIG. 10a;

FIG. 11b is an edge view of the insert of FIG. 11a;

DETAILED DESCRIPTION

Figure 5:
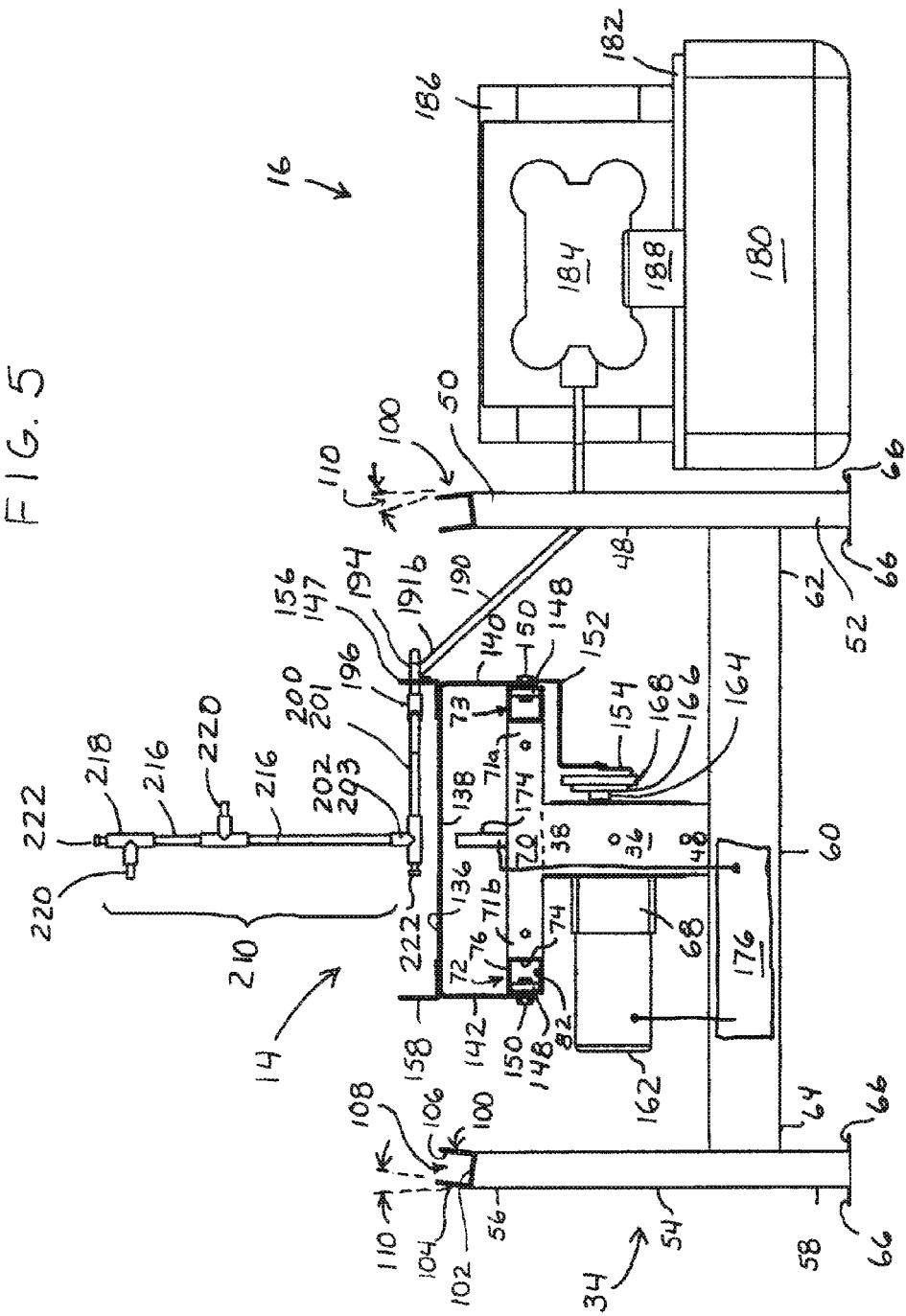
FIG. 5 is an end elevational view of the embodiment of FIG. 3.

Reference will now be made in detail to exemplary embodiments of the irrigation system which are illustrated in the accompanying drawings. Wherever possible, the same reference numbers will be used throughout the drawings to refer to the same or like parts. Preferred irrigation systems 10 are configured and arranged so that they are able to provide nutrients and other essential plant growth materials to one or more plants, preferably at the roots and/or rootlets and/or root balls of one or more plants. In an illustrative embodiment as shown in FIG. 1, an irrigation system 10 may include elements such as a framework 12, a carriage 14 or carriage assembly 15, a delivery arrangement 16 and a plant stand 18. In some embodiments, the framework 12 may be generally longitudinal and have first and second ends 30, 32 that define the length thereof. In some embodiments a framework 12 may have a length that is approximately equal to the width of one plant stand 18. In other embodiments, a framework 12 may have a length that is greater than the width of a single plant stand 18. In yet other embodiments, a framework 12 may have a length that is equal to many plant stand widths. For ease of clarity, only one plant stand 18 has been depicted in conjunction with a framework 12. However, it will be understood that irrigation systems 10 may include a plurality of plant stands. When multiple plant stands 18 are used, it is desirable to position them so that their side members may abut one another. In either case, a plant stand or plant stands, when combined with one or more plant holders (to be discussed later), can form a chamber "C" into which plant roots 26 may protrude. In some embodiments, a plant stand or plant stands 18 may be operatively engaged by one or more rails 100 that may form part of the framework 12. In some embodiments, the rails 100 of a framework 12 may be elevated. In other embodiments, the rails of a framework may be situated at ground level (not shown). The rails 100, which are substantially parallel to each other and the longitudinal axis of the framework 12, are able to be engage a plant stand 18 or plant stands in a constrained manner as the plant stand is be moved between first and second positions of the framework 12.

In some embodiments, a framework 12 may include an element such as a guide assembly 69. The guide assembly 69 operatively engages a carriage assembly 15 (or a single carriage 14) so that the carriage assembly 15 can be moved between the ends 30, 32 of the framework 12 in a constrained manner. The guide assembly 69 may be situated between two rails 100 of a framework 12. In some embodiments, the guide assembly 69 may be elevated. Preferably, the guide assembly 69 is substantially parallel to the rails 100 and the longitudinal axis of the framework 12.

Continuing on, the illustrative embodiment of the framework 12 in FIG. 1 may include one or more sub-frames 34. An exemplary embodiment of a sub-frame 34 may include elements such as a vertically oriented center (or inner) post 36 (see, for example, FIGS. 2 and 5), one or more vertically oriented outer posts 48, 54, and a crossbar 60 that connects the center and outer posts to each other. As will be discussed later in greater detail, the outer posts 48, 54 of each sub-frame 34 may be connected to a rail 100, while the center post 36 of each sub-frame 34 may be connected to the guide assembly 69. Preferably, the sub-frames 34 are spaced apart from each other. In exemplary embodiments, the sub-frames 34 are oriented so that they are transverse to the longitudinal axis of the framework 12.

As mentioned above and as best shown in FIG. 5, a sub-frame 34 that may include elements such as a vertically oriented center (or inner) post 36, a plurality of vertically oriented outer posts 48, 54, and a crossbar 60 that connects the center and outer posts to each other. In an illustrative embodiment, the center post 36 includes an upper end 38 and a lower end 40, with the upper end 38 connected to a crossbeam 70 of a guide assembly 69 and with the lower end 40 connected to a crossbar 60. The crossbar 60 includes opposing ends 62, 64, each of which may be connected to an outer post 48, 54. Each outer post 48, 54 has an upper end 50, 56 to which a portion of a rail 100 may be connected, and a lower end 52, 58 that may rest upon the ground. In some embodiments, the lower end of one or both of the outer posts may be provided with one or more flanges 66. The flange(s) 66 may include one or more aperture(s) (not shown) that can be used in conjunction with fastening elements (not shown) so that the sub-frame 34 may be removably connected to a support (not shown), such as a floor of a structure. As mentioned above, the lower end 40 of the center post 36 may be connected to a crossbar 60 that connects the center post 36 to one or more outer posts 48, 54. In some embodiments, however, the center post 36 may be independent of the sub-frame 34. To that end, the lower end 40 of a center post 36 may be provided with one or more apertured flanges (see, for example, flanges 66 of the outer posts 48, 54) that may be used in conjunction with fastening elements (not shown), so that the center post 36 may be secured to a suitable support (not shown), such as a floor of a structure. In some embodiments, the flanges 66 may be laterally oriented. Similarly, each outer post 48, 54 may be independent of the sub-frame 34. That is, the lower end of each outer post 48, 54 may be provided with one or more apertured flanges 66 that may be used in conjunction with fastening elements (not shown), so that the outer posts may be secured to a suitable support (not shown), such as a floor of a structure. In some embodiments, both the guide assembly 69 and at least one rail 100 extend the length of the framework 12 and a substantially parallel manner. In some embodiments, the guide assembly 69 and at least one rail 100 may be elevated above a support surface (not shown), such as a floor of a structure. The sub-frames and/or framework may be assembled on site or they may be assembled or partially assembled at a remote location and moved to a desired site.

As mentioned above, the upper end 38 of the center post (or inner post) 36 is configured and arranged to be connected to a guide assembly 69. The guide assembly 69 constrainingly engages a carriage assembly 15 (or carriage 14 as the case may be) so that the carriage assembly 15 may traverse between first and second ends 30, 32 of a framework 12. The guide assembly 69, which may be attached to the upper end 38 of the center (or inner) post 36, may include a horizontally oriented crossbeam 70 that includes first and second opposing ends 71a, 71b. Each end of the crossbeam is configured and arranged so as to be able to provide support for a guide member 72, 73.

In an illustrative embodiment, each guide member 72, 73 may be generally c-shaped may include a base and two side walls, with the two side walls defining a slot or channel. One guide member 72 may be connected to first ends 71b of one or more crossbeams of a plurality of sub-frames, while another guide member may be connected to second ends 71a of one or more crossbeams of the plurality of sub-frames (see FIGS. 5 and 6). Since both guide members 72, 73 are essentially the same, only one guide member need be discussed in detail. Guide member 72 may include a base 74 and two side walls 76 and 82, with the two side walls defining a slot or channel 88. In an illustrative embodiment, the guide member 72 is preferably oriented so that a slot 88 defined by its side walls 76, 82 is generally horizontally oriented. Such an arrangement positions the slot 88 of each guide member 72, 73 so that they face in opposite directions. The slot 88 of guide member 72 is configured to receive wheels 148 (see, for example, FIGS. 5, 7a, 7b) from one side of at least one carriage 14 or wheels from one side of a carriage assembly 15. As depicted, the wheels 148 of a carriage 14 or carriage assembly 15 are supported by an upper surface of lower side wall 84 of guide member 72. The upper side wall 76 of guide member 72 may serve to protect the wheels 148 and to prevent the carriage 14 or carriage assembly 15 from being accidently lifted off of the guide assembly 69. The upper side wall 76 of guide member 72 may also serve to provide stability and strength to the guide member 72. Alternatively, in some embodiments, a guide member may have a generally L-shaped profile comprising a base and one side wall, and a carriage or carriage assembly may include upper and lower wheels that are spaced apart from each other so that the side wall can be located therebetween. In other embodiments of the L-shaped guide member and carriage assembly, the upper wheel may remain the same but the lower support wheel may be replaced with a finger that is positioned below the upper wheel and underneath the L-shaped guide member. In yet other embodiments, a guide member may include a generally horizontal support bed with a vertical wall, with the wall engagably straddled by one or more grooved wheels of a carriage.

In illustrative embodiments, the upper end of some or all of the outer posts 48, 54 may be used to provide support for a rail 100. As mentioned above, one or more rails 100 may be used engage a plant stand or plant stands 18 in a constrained manner as the plant stand or plant stands are moved between the ends of the framework 12. In an exemplary embodiment best shown in FIGS. 5 and 6, a rail 100 may be generally u-shaped and include a base 102 and parallel side walls 104, 106. The rail 100 may be connected to one or more outer or outlying posts 48 or 54 of one or more sub-frames 34. In an example of an embodiment, a rail 100 may be generally parallel with the guide assembly 69. A rail 100 may be oriented so that a slot 108 defined by the base 102 and side walls 104 and 106 is generally vertically oriented and so that the slot 108 opens upwardly. In some embodiments, two rails 100 may be canted or angled with respect to the vertical so that their respective slots 108 define planes that converge towards each other at an imaginary point located above the framework 12 (see, for example, in the manner in which top members 252, 282 of the plant stand frames 250, 280 converge toward each other in FIG. 1). To that end, one or both of the rails 100 may be angled 110 with respect to the vertical from a range of approximately 0 degrees to approximately 60 degrees. A preferred range from the vertical is from a range of approximately 5 degrees to approximately 45 degrees. As will be discussed later, the rails 100 may form a portion of a recycling arrangement. That is, the rails 100 may be able to serve as gutters to collect excess condensed plant nutrient/growth material that may collect, condense, or otherwise be deposited on one or more plant stands 18 and which may flow downwardly therealong. In such a situation, rails 100 may be provided with tubing (not shown) that is able to direct the liquid to a reservoir for recycling. Filters (not shown) may be used in conjunction with the tubing, if desired.

Figure 7A:
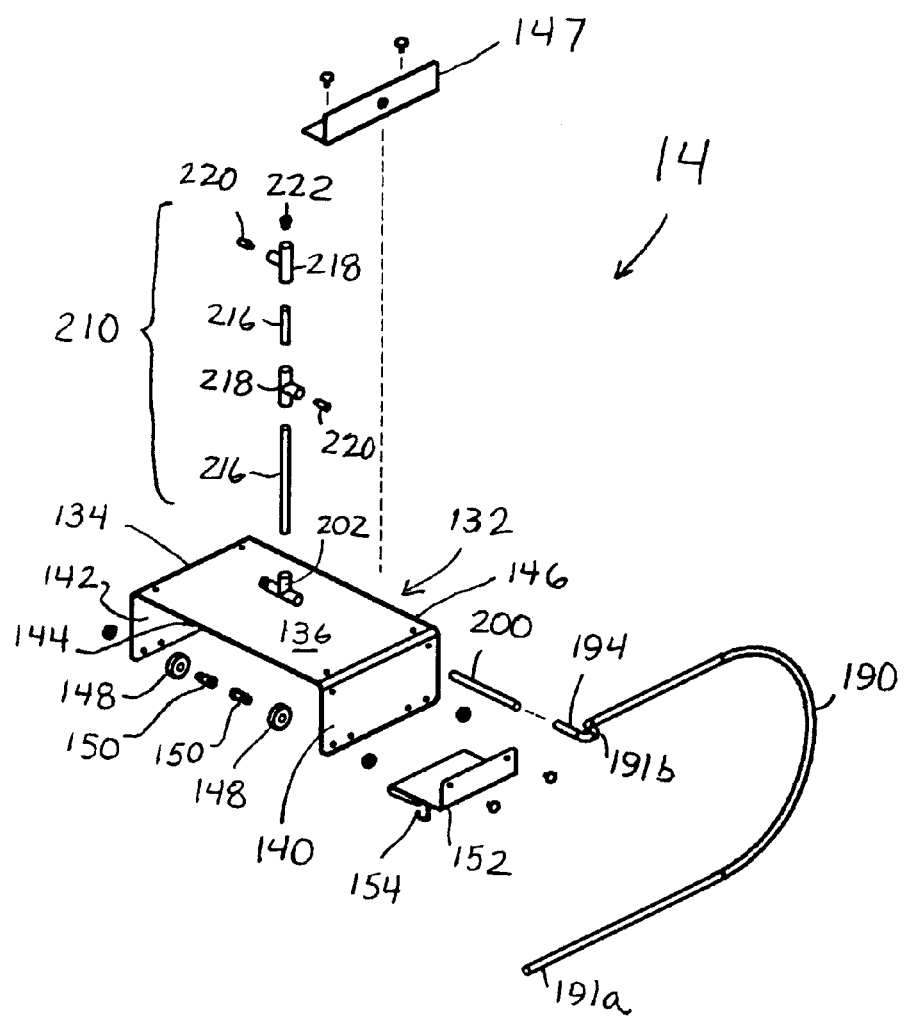
FIG. 7a is a partially exploded perspective view of a single carriage suitable for use with the irrigation system.

An embodiment of a carriage 14 that may be utilized with the irrigation system 10 is depicted in FIG. 7a. The carriage 14 may be used to support a segment of the discharge portion of the delivery arrangement 16. Preferably, the carriage 14 is configured and arranged to be engaged by the guide assembly 69. In some embodiments, the carriage 14 may move between first and second positions along the guide assembly 69. In other embodiments, the carriage 14 may be stationary. A carriage 14 may include elements such as a body 132 having a platform 134 with first and second ends 144, 146, an attachment bar 147, a plurality of struts 140, 142, and a plurality of friction reducing elements 148 (such as a wheel). In an illustrative embodiment, the platform 134 is generally planar and has a first surface 136 and a second surface 138 that are substantially parallel to each other. The first surface 136 of the platform may provide support for a segment of the discharge portion of the delivery arrangement 16. Preferably, the first surface 136 provides support for a branch 210 of the delivery arrangement 16. In some embodiments, the carriage 14 may include an attachment bar 147 that may be connected to the platform 134, and which may serve as an attachment point for a fixture or fitting 194 of the discharge portion of the delivery arrangement 16. The struts 140, 142 of the carriage 14 are substantially parallel to each other and are oriented so that they are substantially orthogonal or perpendicular to a plane defined by the second surface 138 of the platform 134. Preferably, the struts 140, 142 depend downwardly from the platform 134. Each strut 140, 142 may be provided with one or more friction reducing elements (not shown). The friction reducing elements may be, for example, strips of material having a low coefficient of friction, roller bearings, wheels, or the like. In some embodiments, each strut has an inwardly facing surface to which an inwardly facing, rotatably mounted wheel 148 is mounted. The wheels 148 are mounted on transversely oriented axles or spindles 150 in a conventional manner. In some embodiments, each strut of a carriage may include a plurality of rotatably mounted wheels. In an illustrative embodiment there are two struts 140, 142, and each strut is in the form of a planar side wall that extends between the first 144 and second 146 ends of the platform 134. Each side wall may include a plurality if rotatably mounted wheels 148. As will be discussed later, one side wall of a carriage may include an extension 152 and a connecting element 154, wherein the connecting element 154 may be attached to a portion of a drive assembly 160.

A plurality of carriages 14 may be operatively connected by one or more links 156, 158 so as to form a carriage assembly 15 as best shown in FIG. 7b. The links 156, 158 allow the carriages 14 to move between first and second positions in a concurrent manner, preferably along a path defined by the guide assembly 69. In an illustrative embodiment, each link 156, 158 may rigid and in the form of a beam. In other embodiments, a link may be a hollow tube. In other embodiments the link may be a portion of a delivery arrangement 16. In yet other embodiments, the link may be flexible (for example a flexible link could be in the nature of a cable or a chain). In a preferred embodiment, there are two carriages 14 that are operatively connected to each other by two links in the form of beams 156, 158 having L-shaped cross-sections.

Operation of a carriage assembly 15 comprising two carriages 14 and a link two links 156, 158 will now further be discussed. In operation, the carriage assembly 15, which supports the discharge portion of the plant growth material delivery arrangement 16, may be moved by the drive assembly 160 in a back-and-forth or reciprocal motion. The carriage assembly 15 has a preferred length of approximately one-half of length of the guide assembly 69. As will be understood, the link 156, 158 will have a length that permits this overall length to be achieved. Having a carriage assembly 15 that has an overall length of approximately one-half the length of a guide assembly 69 has an advantage over other carriage assembly lengths because it reduces the amount of movement that is needed to attend to plants. This is because the amount of movement needed by the carriage assembly 15 is one-half the amount of movement that would be needed by a single carriage 14. For example, a plurality of plants supported by one or more plant stands 18 positioned along the length of the guide assembly 69. If one end of the carriage assembly 15 is adjacent the first end of a guide assembly 69 and/or framework 12 and the carriage assembly 15 is moved toward the second end of the guide assembly 69 and/or framework 12, plants adjacent the first end of the guide assembly 69 and/or framework 12 and adjacent the middle of the guide assembly 69 and/or framework 12 would simultaneously receive nutrients. As the carriage assembly 15 is moved towards the second end of the guide assembly 69 and/or framework 12, the remaining plants would receive nutrients. As the carriage assembly 15 reaches the second end of the guide assembly 69 and/or framework 12, the plants adjacent the second end of the guide assembly 69 and/or framework 12 and adjacent the middle of the guide assembly and/or framework would receive nutrients. By careful design and/or selection and location of the carriage assembly, link length and nozzles of the discharge portion of the delivery arrangement, nutrient application will not overlap in the middle as the carriage assembly moves between the first and second ends. Other carriage assemblies having more than two carriages are possible and within the scope of the present invention.

Motion to a carriage 14 or carriage assembly 15 may be provided by a drive assembly 160 that is able to move a carriage 14 between the first and second positions P1, P2 along the guide assembly 69, alternatively, the drive assembly is able to move a carriage assembly 15 between the positions P2, P3 or P3, P1 along the guide assembly 69 (see, for example, P1 and P2, or P1 and P3 of FIG. 3). A drive assembly 160 may include may include elements such as a motive source 162 and a flexible belt 168. In some embodiments, the motive source 162 and flexible belt 168 are operatively attached to center posts 36 of a framework 12. In some embodiments, a motive source 162 is attached to a bracket 68 that may be connected to a center post 36. The bracket 68 positions the motive source 162 such that a drive shaft 164 of the motive source 162 is oriented so that it is transverse to the guide members 72, 73 of the guide assembly 69. In some embodiments, an idler roller 170 may be connected to another center post 36, with the idler roller 170 mounted to a spindle 172 that is also oriented so that it is transverse to the guide members 72, 73. Preferably, the drive shaft 164 of the motive source 162 and the idler roller 170 are located adjacent one end of a crossbeam 70 of a sub-frame 34 to which they are attached. The drive shaft 164 of the motive source 162 may be provided with a drive member 166 that engages the flexible belt 168. In an illustrative embodiment, the drive member 166 of the motive source 162 is a sprocket that engages a chain that is operatively connected to a carriage 14 or carriage assembly 15. An example of a combination motor and speed controller 176 that has been found to be suitable for an irrigation system of this application is model no. 41K24RGN-AW2U/4GN30SA and is available from the Oriental Motor U.S.A. Corp. of Torrance, Calif. 90502. It will be understood that other drive assembly components and combinations that are able to achieve similar carriage or carriage assembly movements may be used without departing from the spirit and scope of the invention.

The drive assembly 160 may engage a carriage 14 or carriage assembly 15 by way of an operative connection. In an illustrative embodiment, an operative connection may include elements such as an extension 152 that is connected to a side wall 140 of a carriage 14, and a connecting element 154 that is pivotally connected to the extension 152 and the flexible endless belt 168. The connecting element 154 includes pivot points that are spaced apart from each other by a distance that allows the connecting element 154 to rotate about an extension 152 pivot point as the endless belt 168 pivot point is drawn about a drive member 166 or an idler roller 170 of the drive assembly 160. In doing so, the effective connection between the carriage 14 or carriage assembly 15 and the flexible endless belt 168 can move from a location on a upper portion of the flexible endless belt to a location on a lower portion the flexible endless belt 168. This configuration allows the direction of the carriage 14 or carriage assembly 15 to be reversed as the connection point between the carriage 14 or carriage assembly 15 and the flexible endless belt 168 follows the motion of the belt 168. An advantage with such a configuration is that the direction of a carriage 14 or carriage assembly 15 can be reversed without having to reverse the direction of the motive source 162. Alternatively, the connecting 154 element may be omitted and a carriage 14 or carriage assembly 15 (or an extension 152 thereof) may be directly connected to a flexible endless belt 168, in which case, reversal of motion would be desirable and may be best achieved by using a reversible motive source. The reversible motive source may be an electric, variable speed motor. An example of a reversible motive source that has been found to be suitable for this application is model no. C6T17VC5 and is obtainable from Leeson Electric, of Grafton, Wis. 53024. It will be understood, though, that other motive sources having similar capabilities may be used without departing from the spirit and scope of the invention.

Control of the motive source 162 can be achieved using various implementations. For example, one implementation may include mechanical switches that are operatively connected to the motive source and which are positioned so that they can be actuated by the carriage or carriage assembly to cause the motive source to reverse direction. Alternatively, another implementation may include one or more sensors 174 that are operatively connected to the motive source and which are positioned so that they can be actuated by the carriage or carriage assembly to cause the motive source to reverse direction. Typically, such sensors 174 are in communication with a control box (not shown), which is in communication with (also not shown) the reversible motive source. In an exemplary embodiment, it has been found that suitable results may be obtained using sensor(s) model no. PFM1-BN-1H obtainable from Automation Direct, of Cumming, Ga. 30040. It will be understood, though, that other sensors having similar capabilities may be used without departing from the spirit and scope of the invention. Preferably, the sensors 174, which may be horizontally or vertically oriented, are preferably connected to the frame so that they are in a position to be able to detect when a carriage 14 or carriage assembly 15 is at the ends of the desired movement (this may coincide with the ends of the frame). In the case of a single carriage 14, the sensors 174 could be located at the ends of the path of the carriage 14. In the case of a carriage assembly 15 comprising two carriages 14, the sensors 174 could be located at one end of the path and the other sensor 174 be located midway along the path. In some implementations, there may be a primary and a secondary sensor 174 at each location, with the secondary sensor acting as a back-up for the primary sensor.

The discharge portion which may include a branch 210 and one or more nozzles 220 (FIG. 7b) of the delivery arrangement 16, may be operatively connected to a carriage 14 or carriage assembly 15. When the carriage assembly 15 (or carriage 14 as the case may be) is moved along a guide assembly, an exit port (associated therewith) will be able to apply plant growth material to a plant root 26 on a periodic basis. This periodic basis may range from approximately every 30 seconds to approximately 20 minutes. Preferably, though, the periodic basis may have a range of approximately 30 seconds to approximately 3 minutes. As will be appreciated, a periodic basis is roughly equivalent to the time it takes for a carriage 14 or carriage assembly 15 to move or cycle along a guide assembly 69 from a first position to a second position and then back to the first position. As will also be appreciated, the first and second positions on a guide assembly 69 may vary. In some embodiments, a first position P1 and a second P2 position define a distance D1 on the guide assembly 69. The positions P1 and P2 may be located by the opposing ends of a guide assembly (FIGS. 3 and 6). In other embodiments, a first position P1 and a second P3 position define a distance D2 and may comprise only a partial portion of the total length of the guide assembly 69 (FIGS. 3 and 6). In some embodiments, a partial portion or distance D2 may be centrally located. In other embodiments, the partial portion or distance D2 may be skewed toward one end or the other of the guide assembly 69. As will be appreciated, the speed at which a carriage 14 or carriage assembly 15 traverses a guide assembly 69 may depend upon several variables, such as the distance traveled, the particular plants/crop, the stage of plant growth, etc. In some illustrative embodiments, a carriage or carriage assembly may have a travelling speed in the range of approximately 0 inch per second (stationary) to approximately 12 inches per second. In other illustrative embodiments, a carriage or carriage assembly may have a travelling speed has a range of approximately 1 inch per second to approximately 6 inches per second.

In some embodiments, the travelling speed of the carriage 14 or carriage assembly 15 may be substantially the same in both directions as the carriage 14 or carriage assembly 15 traverses between the ends of the framework 12. In other embodiments, the travelling speed may vary as desired. For example, the carriage 14 or carriage assembly 15 may travel at approximately 1 inch per second in a first direction from a starting point, and when the carriage 14 or carriage assembly 15 reaches an ending point, it may travel approximately 1 foot per second in an opposite direction back to the starting point. Moreover, the travelling speed need not be constant. Some embodiments may allow the speed of a carriage 14 or carriage assembly 15 to be faster and/or slower as it moves between the start and end points, and some embodiments may allow a carriage 14 or carriage assembly 15 to pause once or many times as it moves between start and end points. In this way, operation of the irrigation system 10 can be tailored to accommodate plants that require more nutrients as opposed to plants that require fewer nutrients. Other variations of carriage 14 or carriage assembly 15 travelling speeds are possible without departing from the spirit and scope of the invention. As will be understood, control of the carriage 14 or carriage assembly 15 may be automated by a programmable controller 176. An example of a programmable control system that has been found to be suitable for this application is the Micro800 and is obtainable from Allen Bradley at <http://ab.rockwellautomation.com/Programmable-Controllers/Micro800>. For embodiments in which the travelling speed of the carriage 14 or carriage assembly 15 may be substantially the same in both directions as the carriage 14 or carriage assembly 15 traverses between the ends of the framework 12, drive assemblies that employ a reversible motive source are preferred, particularly when nozzles 220 have the ability to apply plant growth material in two different directions. That is, when the carriage 14 or carriage assembly 15 moves in a first direction, the nozzles 220 apply plant growth material to substantially only the exposed plant roots 26 of the first frame 250, and when the carriage 14 or carriage assembly 15 moves in a opposite direction, the nozzles 220 apply plant growth material to substantially only the exposed plant roots 26 gown in the second frame 280. Thus, delivery of plant growth material may oscillate as the carriage 14 or carriage assembly 15 moves back and forth. This bi-directional oscillating application of plant growth material may be accomplished in a number of ways. In one embodiment, discharge nozzles 220 point in one direction and a vertical branch 210 is rotatably mounted about its longitudinal axis on the carriage 14. Rotation may be provided the plant growth material as it flows through the conduit 190. This could be accomplished by providing an impeller that is geared to a larger gear, which in turn is linked to branch 210 in the manner of an oscillating sprinkler. In another embodiment, rotation of the branch 210 may be achieved by providing the branch with a horizontal lever having an end that is engaged by a horizontal projection that extends from the frame. When the carriage reaches the end point, the projection will engage the lever and rotate the branch in one direction. When the carriage reaches the other end point, a similar projection will engage the lever and rotate the branch in the opposite direction. It will be understood that other similar mechanical mechanisms may be used without departing from the spirit and scope of the invention.

Alternatively, the branch 210 may be stationary and the nozzles may be controlled by solenoids. Other implementations that achieve the bi-directional oscillation are possible. For example, there may be two vertical branches 210 for each carriage, with each branch having nozzles that are dedicated to deliver plant growth material to a particular frame. In such an instance, flow of plant growth material could be controlled (by solenoids) so that one, both, or none of the vertical branches is able to deliver plant growth material to the plants. An example of solenoids that have been found to be suitable for this application are series numbers 3827 and 1500 and are obtainable from Spartan Scientific of Boardman, Ohio 44513. It will be understood, though, that other solenoids having similar capabilities may be used without departing from the spirit and scope of the invention. Alternatively, each branch 210 may be provided with its own supply line that may be controlled be its own solenoid.

Figure 15:
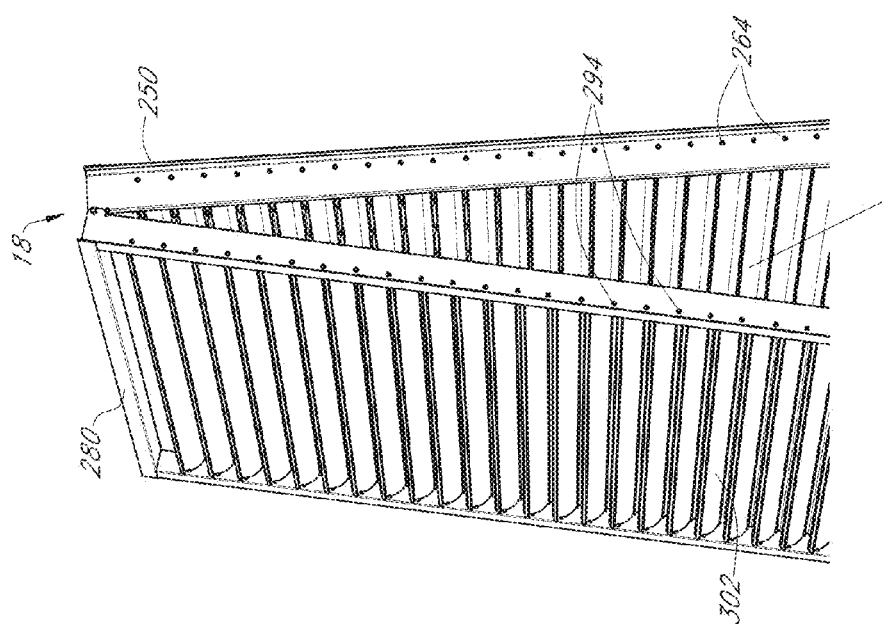
FIG. 15 is a partial, perspective end view of a plant stand, the view looking into the chamber "C" of the plant stand.

A delivery arrangement 16 is used to convey nutrients and/or water and/or plant growth material (i.e. growth material) to one or more plants in the form of liquid, and/or mist and/or vapor, and/or gas. Preferably, the growth material is directed towards the roots 26 of a plant 22 or plants as they project through apertures 276, 306 in a plant holder 272, 302 that is carried by a plant stand 18 (see, for example, FIGS. 8, and 9a). As will be discussed later, the roots 26 of a plant 22 or plants are preferably located within a chamber "C" defined by frames 250, 280 and/or plant holders of a plant stand 18 (see, for example, FIGS. 13 and 15). The delivery arrangement 16 is configured and arranged so that it may be operated on a continuous basis and may be operatively connected to a carriage 14 or carriage assembly 15 so that it may apply growth material to plants as the carriage 14 or carriage assembly 15 moves between first and second positions P1, P2 or P2, P3 along the guide assembly 69. And, because the delivery arrangement 16 may operate at lower pressures than with traditional aeroponic systems, this may allow the use of less expensive materials and reduce overall costs. For example, exit ports 219 of a branch 210, as will be discussed below, may be made from plastic or the like.

Delivery arrangement 16 has an intake portion that may elements such as a main tank, a reservoir 180, a pump 184, a motive source 186 for the pump 184, and a booster pump 188. The delivery arrangement 16 also has a discharge portion that may include elements such as, a supply line, a fitting, a trunk, a branch and an exit port. In an illustrative embodiment, a delivery arrangement 16 may include reservoir 180, which that may be periodically resupplied or replenished from a main supply tank (not shown) using a hose (also not shown). The reservoir 180 contains the plant growth material and its volumetric capacity is sized so that the irrigation system 10 may operate for significant periods of time without needing to be replenished by the main supply tank. The size and capacity of the reservoir 180 is dependent upon the size of the irrigation system, and may have a capacity that can range from approximately 20 gallons to approximately 1000 gallons. The growth material in the reservoir 180 may be conducted to an input end of a pump 184 that is operatively connected to a motive source 186. Both the pump 184 and the motive source 186 may be attached to a platform 182 that can rest on top of the reservoir 180. An output end of the pump 184 may be connected to one end 191a of a supply line 190 whose other end 191b may be connected to a carriage assembly 15 (or a single carriage 14, as the case may be). In some embodiments, the supply line 190 may be connected to a trunk 200 that is in communication with a branch 210, with the branch 210 having an exit port 219 through which plant growth material may flow. In some embodiments, the exit port 219 may be formed by creating an appropriately shaped and sized hole in the branch. In an exemplary embodiment, an exit port 219 may comprise a nozzle 220 that is removably connected to the branch 210 (see, for example, FIG. 7a). In other embodiments, the supply line 190 may be connected to a plurality of trunks 200, 201, wherein each trunk 200, 201 may be in communication with a branch 210 and wherein each branch 210 may include an exit port 219 through which plant growth material may flow. In some embodiments, the exit port 219 may be formed by creating an appropriately shaped and sized hole in the branch (for example, drilling a hole in a side wall of a closed-off branch). In another exemplary embodiment, an exit port 219 may comprise a removable nozzle 220 (see, for example, FIG. 7b). The supply line 190 may be in the form of flexible hose or other structure capable of delivering a flow of nutrients and other essential plant growth material from one location to another location. A preferred material for the supply line is thick-walled rubber; however other materials can be used without departing from the spirit and scope of the invention. The delivery arrangement 16 of various embodiments of the irrigation system may have different flow rates, depending upon the cross-sectional area of an exit port 219, or nozzle 220 and the number of exit ports or nozzle per branch. For example, a single nozzle 220 may have a flow rate in the range of approximately 0.1 gallons per minute (gpm) (for a nozzle having a small diameter) to approximately 10 gpm (for a large diameter nozzle. In addition, the delivery arrangement needs to have the capability of providing sufficient pressure to the exit port(s), which can have cross-sectional areas that are larger than the diameters of the nozzles and which can have flow rates that accordingly larger. For exemplary embodiments, a working pressure of 40 psi or greater is desired. A combination of a pump 184 and motive source 186 that meet these operational requirements, and which has been found to be useful with these embodiments includes a combination pump and motive source available from the FOGCO Company of Chandler, Ariz. 85226 (model no. 5300216). Other combinations of pumps and motive sources that meet the operating conditions of the various embodiments of the irrigation system are possible without departing from the spirit and scope of the invention.

In some embodiments, it may be desirable to include a booster pump 188 that may be interposed between the reservoir 180 and the main pump 184. As depicted, the delivery arrangement 16 is positioned so that one end 191a of a supply line 190 is located about midway along the longitudinal length of the framework 12, while the other end 191b of the supply line is allowed to move with the carriage assembly 15 (or carriage 14) to which it is connected. As will be understood, this allows the supply line 190 to be used in an efficient manner as the carriage arrangement moves between the ends of the framework 12. Note that the pump 184 and its associated motive source 186 need not be attached to the reservoir itself (see, for example, FIG. 1). For example, the pump 184 and motive source 186 could be located midway along the longitudinal length of the framework 12 and the reservoir 180 could be located near an end of the framework 12 and connected to the supply pump by a hose. However, the arrangements, as depicted, are preferred because they can be moved about with relative ease and result in smaller footprints. Referring now to FIGS. 7a and 7b, in an illustrative embodiment of an irrigation system, the supply line end 191b may be operatively connected to a carriage 14 or a carriage assembly 15. Preferably, this is at the midpoint of the attachment bar 147 on a single carriage 14 or at the midpoint of one of the beams 156, 158 that connect the carriages 14 to each other in a carriage assembly 15. Preferably, the supply line 190 is in communication with a fitting or fixture 194 that operatively connects the supply line 190 to a side wall of the attachment bar 147 or one of the beams 156, 158. In some embodiments, the fitting or fixture 194 may include an element such as a hollow tube that is connectable to a single trunk 200 (for a single carriage) or T-connector 196 that is connectable to more than one trunk 200, 201 (for a carriage assembly). The T-connector 196 may be oriented such that opposing openings are able to be connected to trunks 200, 201. Each trunk, which is in fluidic communication with the supply line, may extend from the T-connector 196 to a platform 134 of one of the carriages 14, where it may be attached thereto. The end of each trunk 200, 201 may be provided with a connector 202, 203, to which a branch 210 may be attached so that it is in fluidic communication therewith. The connector 202, 203 positions the branch 210 so that it extends upwardly in a generally vertical orientation above the surface of the platform 134. In an illustrative embodiment, the trunk-branch connector 202, 203 is a T-connector that has one opening closed off with a removable plug 222. Other connectors may be used without departing from the spirit and scope of the invention. Referring back to FIG. 2b, in alternative embodiment, a supply line 190 may be elevated so that it does not drag upon the surface of a floor. Such elevation may be provided by a mast 204. The mast 204 can be connected to the main frame 12 at a location midway between the ends 30, 32, with the mast 204 being generally vertically aligned and having a bottom end 205, a transition 206 and a top end 207. The transition 206 serves to position the top end 207 that it is more or less directly above a carriage or carriage assembly. The top end 207 has an elevation that can range from a position that is slightly higher than the carriage 14 (or carriage assembly 15) to a position that is slightly lower than the apex of a plant stand 18. The supply line 190 can then be connected to the mast 204 so that it is supported thereby and so that the end 191b of the supply line 190 terminates at or near the top end 207 of the mast 204. The end 191b of the supply line 190 may then be connected to a first end of an intermediate conduit 208. A second end of the intermediate conduit 208 may then be connected to a single trunk 200 or to a T-shaped connector 196 that is connected to multiple trunks 200, 201. The intermediate conduit 208 is preferably formed from a self-coiling material that is able to extend and retract as the carriage 14 or carriage assembly 15 traverses along its path. It has been discovered that such an arrangement reduces the chances of the supply line becoming snagged on moving parts and also reduces wear and tear. Each branch 210 is hollow and preferably has a diameter in the range of approximately 1/16 inch to approximately 1 inch. Each branch 210 may be built up of sections of tubing 216 (or hollow spacers), connectors 218 and nozzles 220. Each branch 210 may be adjusted, either by moving the entire branch as a unit, or by bending portions of the branch. Preferably, the ends of each branch 210 can be disabled or otherwise closed off by one or more plugs 222. Each branch 210 may be provided with one or more nozzles 220 that may be used to apply nourishment and plant growth material to a plant. In an illustrative embodiment, each branch 210 may include two nozzles 220 that are oriented so that they point in opposite directions. As will be understood, the particular nozzle sizes and operational pressure of the delivery arrangement may be used to achieve different results. For example, some plants may grow better using a liquid application, whereas other plants may grow better using a misting application. Preferred misting intervals are between about 30 seconds to about 20 minutes. Still other plants may grow better using a vaporized application or a gaseous application of plant growth material. As mentioned above, each exit port 219 may be formed by creating an appropriately shaped and sized hole in the respective branch. For example, in some embodiments, an exit port 219 shape may be geometric, non-geometric, symmetric or non-symmetric so as to be able to create different discharge patterns. In other embodiments, the size of an exit port 219 may have different cross-sectional areas that have different flow rates. As will be appreciated, different plants/crops may require different growth environments that may be created using different exit ports. That is, some plants/crops may benefit by using an exit port 219 having a flow rate of 2-3 gallons per minute, while other plants/crops may benefit by using an exit port 219 having a flow rate of 2-3 gallons per hour. In that regard, it is envisioned that each branch 210 and its respective exit ports 219 could be pre-fabricated as a unitary structure designed for a particular plant/crop. If a user decides to grow a different plant/crop having a different growth cycle and growth requirements, the branch-exit port unit could be exchanged with another more suitable branch-exit port unit. In some embodiments, it may be desirable for a discharge produced by an exit port to be in the form of a fine mist, vapor or gas. In such situations, the respective exit ports 219 of each branch may be provided with a removable nozzle 220. Nozzles 220 capable of producing such discharges often have orifice diameters in the range of approximately 0.008 inches to approximately 0.020 inches, and may be obtained through companies such as FOGCO Systems, Inc. Chandler, Ariz. 85226. The nozzles 220 may be positionable relative to the branch 210 to which they are attached using adjustable connectors such as a swivel ball connector. Alternatively, the branches 210 may be adjustably positionable relative to the trunk to which they are connected, and may be formed from flexible, metallic tubing. It has been discovered that because of the relatively continuous operational nature of the irrigation system, the above mentioned exit ports, nozzles, fitting and branch components may be formed from materials such as ABS plastics or the like. Alternatively, in some implementations, combination hydro-air atomizing nozzles may be used. Typically, such nozzles include a source of pressurized air that is connectable to the nozzle and which is able to modify and control the growth medium droplet size that exits the working end of the nozzle. The nozzle may have a water pressure working range of approximately 2 psi to approximately 120 psi, and an air pressure working range of approximately 2 psi to approximately 120 psi. An example of a hydro-air atomizing nozzle that has been found to be suitable for this application is model no. ¼ inch J series and is obtainable from Spraying Systems Co. at <http://www.spray.com/index.aspx>. Other such nozzles that meet the operating conditions of the various embodiments of the irrigation system are possible without departing from the spirit and scope of the invention. The source of pressurized air can be provided by an air compressor that is operatively connected to a motive source in a single unit 197. An example of a self contained, powered air compressor that have been found to be suitable for this application is model no. D55151 and is obtainable from the DeWalt Industrial Tool Co. of Baltimore, Md. 21286. Other such compressor and motor arrangements that meet the operating conditions of the various embodiments of the irrigation system are possible without departing from the spirit and scope of the invention. The compressor 197 may be operatively connected to a nozzle or nozzles 220 by a conduit 198 in a manner similar to the connection between pump 184 and a trunk 200 or a T-connector and trunks 200, 201 discussed above. That is, a first end 199a of the conduit 198 is connected to the compressor 197 at an output port and a second end 199b is operatively connected to a nozzle or nozzles 220.

Figure 9A:
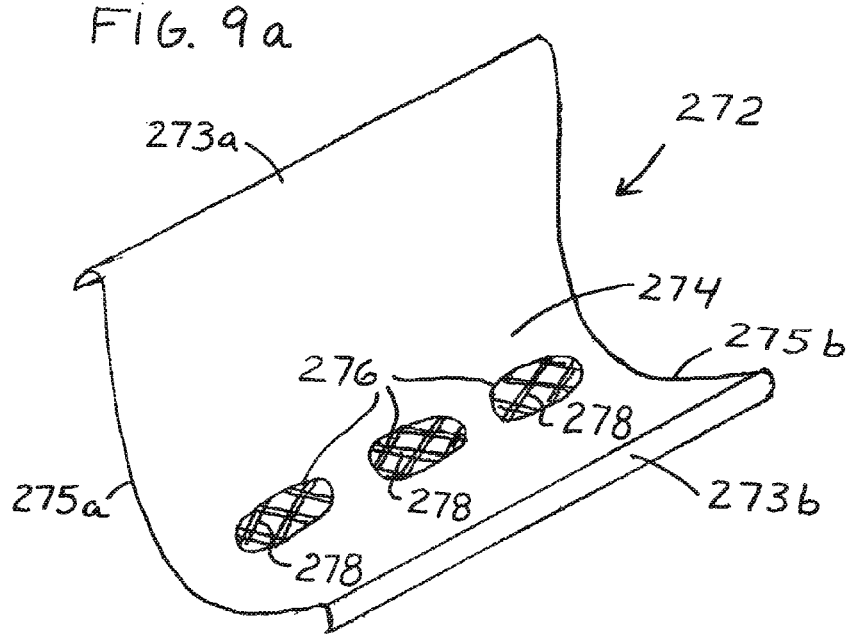
FIG. 9a is a perspective view of an embodiment of a plant holder.
Figure 9B:
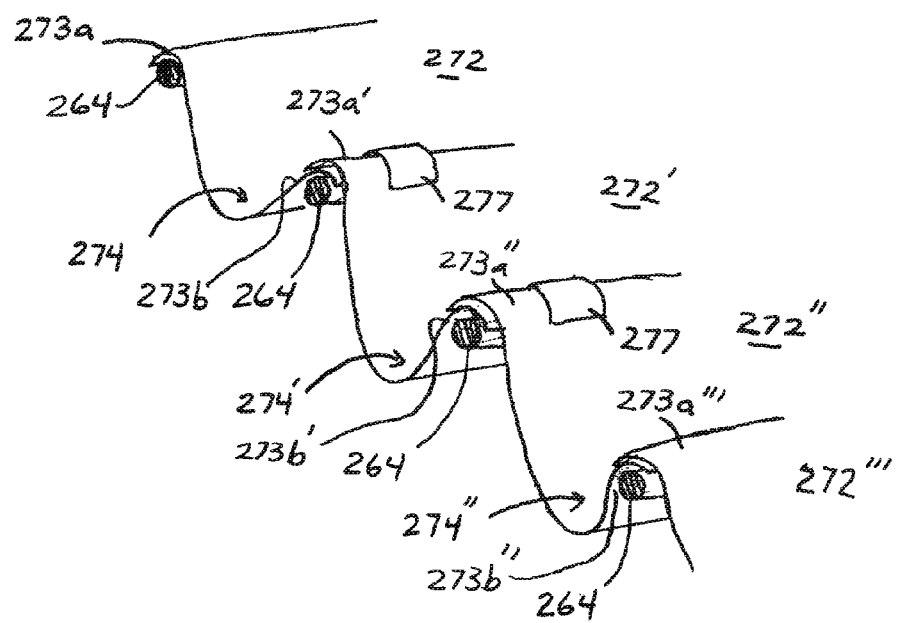
FIG. 9b is a partial, perspective end view of a plurality of plant holders of FIG. 9a as they may be arranged on crossbars of a plant stand frame.
Figure 10A:
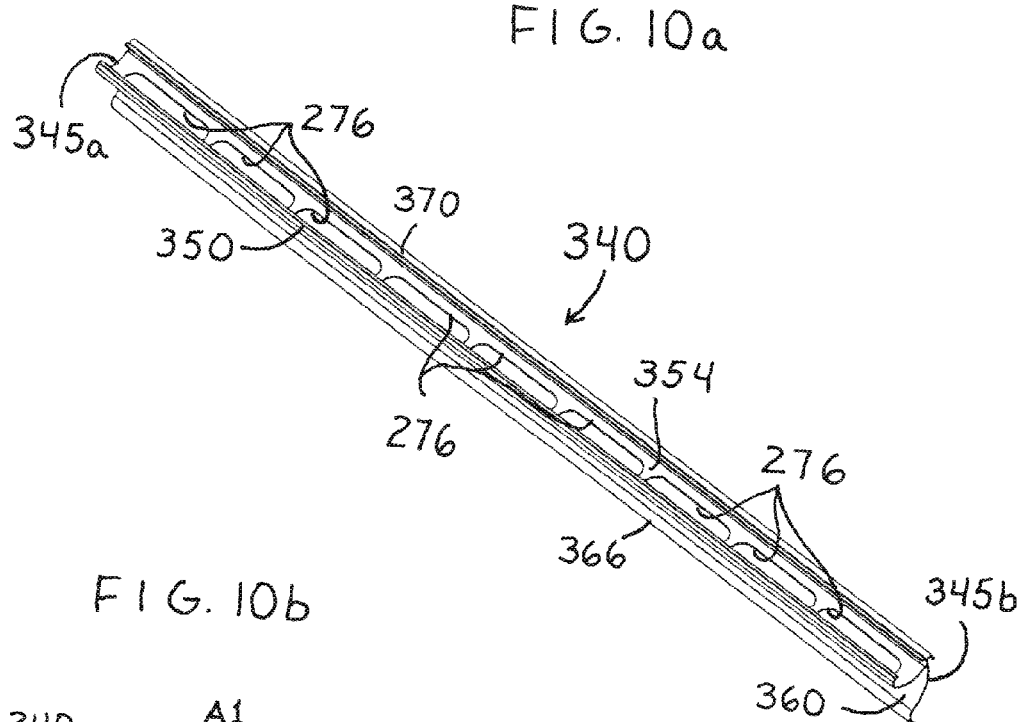
FIG. 10a is a perspective view of another embodiment of a plant holder.
Figure 10B:
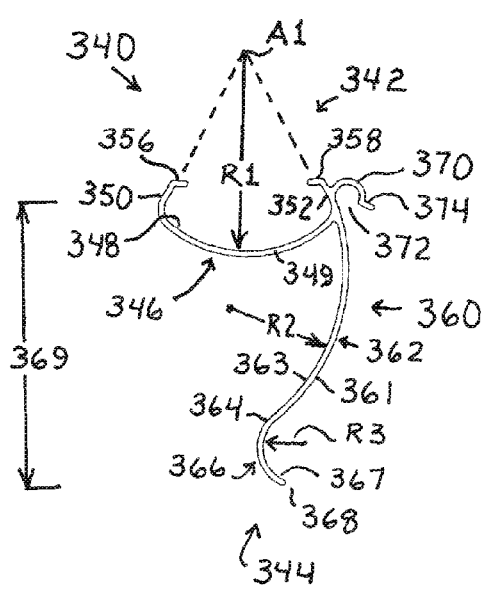
Figure 10C:
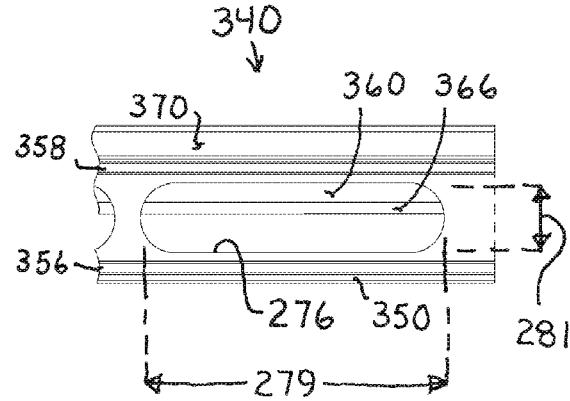

As mentioned above, one or more plant stands 18 may be used in conjunction with the irrigation system 10. Generally, a plant stand 18 is able to retain plants 22 and position their roots 26 so that they are able to receive nutrients and/or growth material and/or water from the discharge portion of the delivery arrangement, while the shoots 24 are able to extend upwardly in a normal fashion. A plant stand 18 may include elements such as a frame, a plant holder, and support wheels. In an illustrative embodiment, a plant stand 18 may include a first frame 250 and a second frame 280. Each frame 250, 280 may include elements such as a top member 252, 282, a middle member 254, 284, a bottom member 256, 286, first and second side members 260 and 266, 290 and 296, one or more crossbars 264, 294, and a plant holder 272, 302. The frames 250, 280 may be equally sized and configured to be pivotally connected to each other at their upper ends. The pivot connection 308, 310 allows a plant stand 18 to be easily compacted, moved to another location and be quickly erected for use. When coupled together, the first and second frames 250, 280 can define an angle 314 having a range of approximately 5 degrees to approximately 70 degrees, and more preferably a range of approximately 10 degrees to approximately 60 degrees. The frames 250, 280 may be held in a particular angular relation by one or more adjustable straps 312. The side members 260, 266 of frame 250 and side members 290, 296 of frame 280 may include a plurality of apertures 262 and 268, 292 and 298 that receive a plurality of crossbars 264, 294, respectively. The crossbars 264, 294 may extend between, and connect to, the side members of a single frame 250, 280, respectively. In some embodiments, ends of each crossbar 264, 294 may be inserted through a respective aperture 262 and 268, 292 and 298 and secured there to with a self-locking washer. In some preferred embodiments, the apertures 262, 268, 292, 298 are sized to constrainingly receive the ends of crossbars 264, 294. In other embodiments, the apertures 262, 268, 292, 298 comprise slots and the ends of crossbars 264, 294 may move between ends of the slots to which they are operatively connected. In exemplary embodiments, the plurality of crossbars 264, 294 are parallel to each other and with the top and bottom members of the frame. In some embodiments, the crossbars 264, 294 may be evenly spaced from each other along the length of the side members of a frame. The crossbars 264, 294 of the first and second frames 250, 280 are configured and arranged to support one or more horizontally oriented, longitudinal plant holders 272, 302, which in turn can support one or a plurality of plants 22. Depending upon the particular implementation, a longitudinal plant holder may have a length that can range from approximately six inches to approximately twelve feet or longer. Preferably, the plant holder length as a preferred length in the range of about approximately three feet to approximately eight feet. Turning now also to FIG. 9a, illustrating a plant holder 272 may have an upper end 273a, a lower end 273b, and opposing ends 275a and 275b, wherein the upper and lower ends define a width and wherein the opposing sides define a length. The holder 272 may be somewhat flexible and may be allowed to drape between adjacent crossbars 264 so that the upper end 273a, the lower end 273b and the opposing ends 275a, 275b form a generally horizontally oriented, longitudinal trough 274. Depending upon the particular implementation, the trough 274 may have a width that can range from approximately one-half inch to approximately six inches. Preferably, the trough 274 has a preferred width in the range of about approximately one inch to approximately three inches. More preferably, the trough 274 has a width of approximately two inches. As depicted, the trough 274 may include one or more apertures 276 that are spaced along the length of the holder 272. In a preferred embodiment, the apertures 276 are generally oblong and are in alignment with the longitudinal axis of the holder. In a preferred embodiment, the apertures 276 have a length 279 of approximately four-and-one-half inches and a width 281 of approximately one inch. In some embodiments, the apertures 276 are evenly spaced from each other along the length of the holder 272. In preferred embodiments, spacing between the ends of adjacent apertures 276 may range from approximately one-eighth of an inch to approximately two inches. In more preferred embodiments, spacing between the ends of adjacent apertures 276 may range from approximately one-quarter of an inch to approximately one inch. In an illustrative embodiment, adjacent apertures 276 are spaced from each other by approximately three-quarters of an inch. As will be appreciated, apertures having different shapes and sizes may be used. The oblong apertures may have lengths greater or less than the preferred length and widths greater or less than the preferred width without departing from the spirit and scope of the invention. For example, the oblong aperture 276 lengths can have a range of approximately one quarter inch to approximately twelve inches and widths of approximately one-eighth inch to two inches. Further, the apertures 276 need not be oblong, and they may be circular, oval, square or some other suitable shape. In some instances, it may be desirable to grow plants from seeds or use seedlings directly in the trays. When plants are grown directly in trays 340, 340', 340", 340'", it may be necessary to provide bedding material 278 that may be positioned over an aperture, and which prevents a plant seed or seedling from falling through the aperture. Preferably, bedding material 278 provides structure to which a plant can anchor itself, while allowing the plant 22 to send out shoots 24 and roots 26 in a normal fashion. Preferably, the bedding material 278 also allows air to circulate therethrough. The types of bedding material 278 that may be used in this application may be quite varied and may include, for example, screening, mesh, netting, woven material, matting, synthetic fleece, vermiculite, beads, pebbles, gravel, grow blocks, baskets, or the like. Yet other materials may be used without departing from the spirit and scope of the invention. As depicted in FIG. 9a, a bedding material of mesh or woven material 278 may be positioned adjacent the apertures 276. Preferably, the mesh or woven material bedding material 278 is sufficiently sized to prevent a seedling from falling through the aperture while providing enough of a structure to which a plant may anchor itself and grow. Alternatively, a plant holder 272 may include a plurality of generally horizontally arranged pockets in the manner of a single egg-holding row of an egg carton, and the pockets may be provided with apertures and bedding, if desired (not shown). As will be appreciated, the relatively flexible nature of the plant holder 272 may allow cross-sectional configurations of the trough(s) 274 to take the shape of a catenary. Where the plant support frames 250, 280 are angled with respect to the vertical, as shown in an illustrative embodiment of FIGS. 1, 8 and 9b, the cross-sectional configuration of a trough 274 may be somewhat asymmetrically shaped, such as a "J" shape. Advantageously, when a frame such as 250 and/or 280 is angled, the plant holder 272 arranges rows of plants so that they are held in a plurality of tiers or steps. This allows the density of the plants per square unit to be greater than the density of plant per square unit that is possible with a horizontal plant arrangement. The plant holder 272 may comprise a single piece of material that can be positioned over crossbars 264, 294 of the frame 250, 280. In an illustrative embodiment, the plant holder 272 may comprise a plurality of smaller sections that can be connected to each other to form a larger holder (see, for example, FIGS. 9a and 9b). The adjacent sections 272, 272', 272" may be arranged in an overlapping configuration so that a portion of an upper end 273a' of one section is coincident with a portion of a lower end 273b of the adjacent section. In some embodiments, the upper and lower ends of a section 272, 272', 272" may be shaped so as to enable the upper and lower ends of adjacent sections to partially nest together and form a connection therebetween (see, for example, FIG. 9b). Preferably, the connection between the upper and lower ends of such adjacent sections 272, 272', 272" may be supported by a crossbar 264. It may be desirable to further enhance the connections between adjacent sections 273a, 273b and crossbars 264 by providing fastening elements 277, such as clips, that serve to prevent accidental disconnection of the components. In other embodiments, adjacent sections may be connected edge-to-edge in the manner of a tambour door (not shown). In some embodiments, a plant holder may be partially or substantially formed with a desired cross-sectional configuration prior to installation on a frame. In preferred embodiments, a holder comprises opaque material so as to prevent light from impinging on the roots of a plant. When in an operational configuration, the plant holders 272, 272', 272" may form a chamber "C" or partial enclosure (see, for example, FIGS. 13 and 15) into which roots 26 of a plant 22 or plants may extend. In another illustrative embodiment depicted in FIGS. 10a, 10b and 10c, a longitudinal plant holder 340 may include elements such as a body 340, a tray 346, a downwardly depending leg 360, a foot 366, a crossbar receiving channel 354 and opposing ends 345a, 345b. In a preferred embodiment, an upper end 342 of the body 340 has a rearwardly extending, longitudinal tray 346 that, when in use, is generally horizontally oriented and able to receive plants. The tray 346 can include bottom 348 and upwardly extending opposing sides 350, 352. The opposing sides and bottom define an upwardly opening, longitudinal channel 354 with opposing ends 345a, 345b that receives plants. The bottom 348 may include a downwardly extending bowed portion and may include one or more apertures 276 as discussed in detail above. As with the previously described embodiment, and depending upon the particular implementation, the tray bottom 348 may have a width that can range from approximately one-half inch to approximately six inches. Preferably, the tray bottom 348 has a preferred width in the range of about approximately one inch to approximately three inches. More preferably, the tray bottom 348 has a width of approximately two inches. Although the bottom 348 of the tray 346 may be essentially flat, in a preferred embodiment, the bottom has a bowed portion 349. The bowed portion 349 may have a radius R1 that ranges from approximately no radius (flat) to approximately a one quarter inch. The bottom 348 may also be v-shaped (not shown), if desired. However, the preferred bowed portion 349 of the bottom 348 has a radius R1 in the range of approximately three quarters of an inch to approximately three inches. More preferably, the bowed portion 349 of the bottom 348 has a radius R1 of approximately one-and-a-quarter inches. The opposing sides 350, 352 may be angled relative to each other such that they converge at an imaginary point A1 above the tray 346. Preferably, the opposing sides 350, 352 have a preferred height in the range of about approximately one-sixteenth of an inch to approximately one-and-a-half inches. In a preferred embodiment, the opposing sides have a height of approximately one-quarter inch. It will be understood that the sides 350, 352 need not have the same height and that they could have different heights, if desired. Continuing on, in some embodiments, each side wall 350, 352 may be provided with an inwardly extending ledge 356, 358 that can reduce the opening of the channel 354. Preferably, the opening of the channel 354 has a preferred width in the range of about approximately one-half inch to approximately three inches. In a preferred embodiment, the inwardly extending ledges 356, 358 define the opening of the channel 354 and the opening is in the range of approximately one-half of an inch to approximately one-and-a-three-quarters inches. A leg 360 is connected at the upper end 342 to a forwardly facing edge of the tray 346 and extends downwardly therefrom. In a preferred embodiment, the leg 360 includes a front surface 361, a rear surface 363 and a forwardly facing arc 362. Preferably, the arc 362 has a radius R2 that ranges from approximately no radius (flat) to approximately one inch. In an exemplary embodiment, the forwardly facing arc 362 of the leg 360 has a radius R2 that ranges from approximately no radius (flat) to approximately one-and-one-half inches. At the end of the arc 362, the leg 360 has a transition point 364 that begins to form a downwardly depending, rearwardly curving foot 366. The foot 366 includes a front surface 367 and terminates with a downwardly depending and forwardly facing edge 368. The curve of the foot 366 and its front surface 367 may have a radius R3 that ranges from approximately no radius (flat) to approximately one quarter of an inch. In a preferred embodiment, the curve of the foot 366 has a radius R3 of approximately three-eights of an inch. Together, the leg 360 and foot 366 have a vertical height 369 of approximately three inches. As will be understood, other vertical heights may be utilized without departing from the spirit and scope of the invention. For example, the height can be as little as one inch are it can be greater than one foot. At the upper end of the leg 360, and adjacent to a forward facing edge of the tray 346, there may be a partially circular section 370 that defines a downwardly opening longitudinal slot 372. The slot 372 is configured and arranged to receive and partially encircle a crossbar 264 such as depicted in FIG. 9b, and/or 294 of the second frame 280 (not shown). In a preferred embodiment, the circular section 370 may include a radially arranged, outwardly extending flange 374 that facilitates attachment and removal of the holder 340 to a crossbar 264, 294 of a frame 250, 280. Preferably, the holder 340 is constructed of material that is sufficiently resilient so that the holder 340 may be snapped into place over a crossbar 264, 294 and removed by manipulating the flange 374 so as to temporarily enlarge the slot 372 to facilitate removing the holder 340 from the crossbar 264, 294. Note that while the holder 340 is connected to a crossbar 264, 294, it can rotate relative thereto. It will be understood that holders 340', 340" and 340'" are preferably identical to holder 340.

Figure 10D:
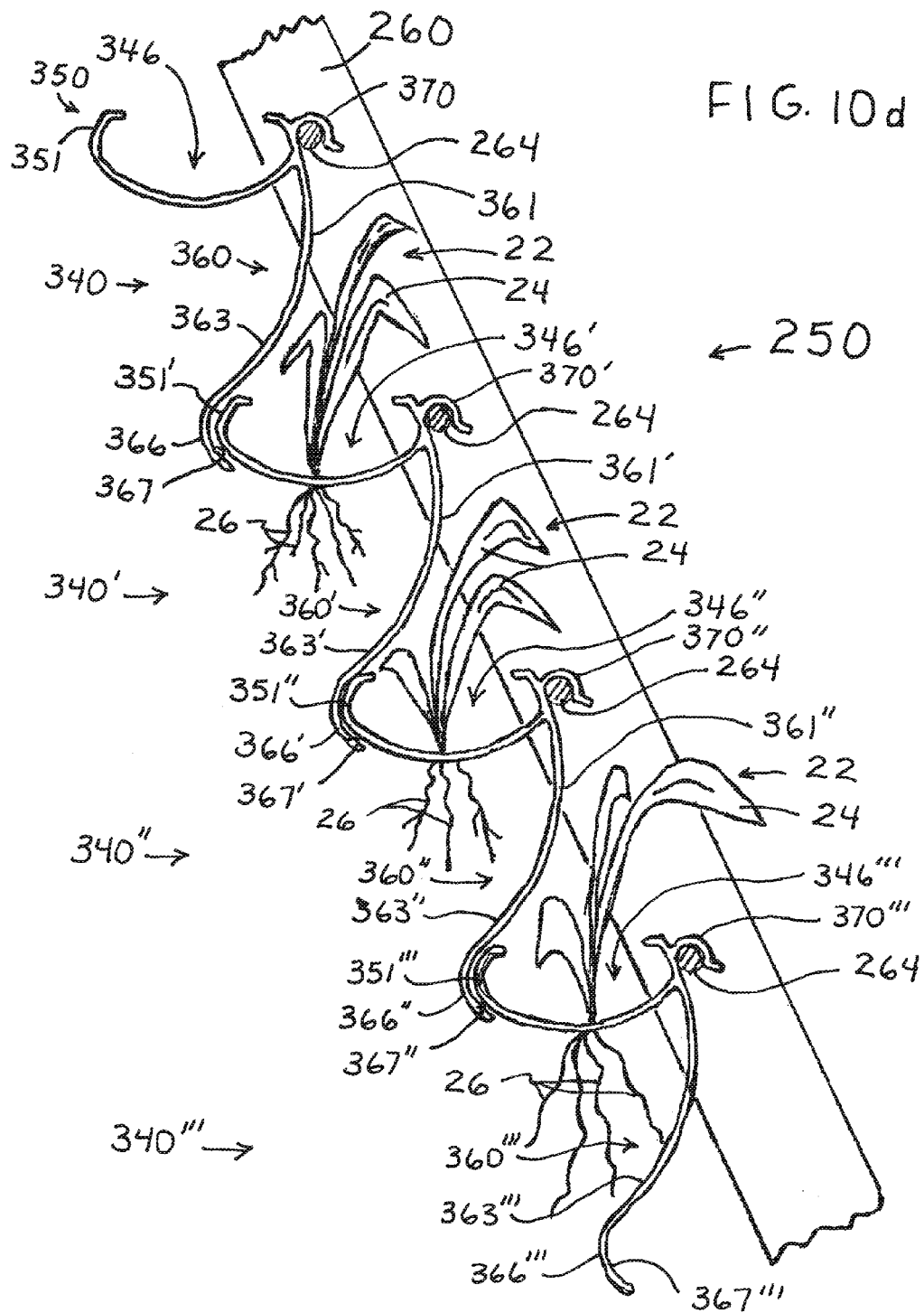
FIG. 10d is a partial, side elevational view of a plurality of plant holders of FIG. 10a as they may be arranged on crossbars of a plant stand frame.

Turning now to FIG. 10d, a partial, side elevational view depicts a plurality of holders 340, 340', 340" and 340'" as they may be arranged on a frame 250 of a plant stand 18. As depicted, the front surface 361 of the leg 360 of the topmost holder 340 faces a plant that is growing in a holder 340' that is situated below the topmost holder 340. As the plant grows larger, the front surface 361 of the leg 360 will serve as a support by allowing the plant to lean up against it. Continuing on, a front surface 367 of the curved foot 366 engages a rear surface of the rearmost side 351' of the tray 346' of the holder 340' that is situated therebelow. As can be seen, the tray 346' of the lower holder 340' will prevent the leg 360 of the upper holder 340 from swinging forwardly. Continuing on, the second holder 340', which includes a plant, illustrates an important feature of the holder. Note that the roots of the plant are not impinged by the leg 360' situated below. This is because of the arc 362' that is present in the leg 360'. By providing the leg 360' with an arc 362', the rear surface 363' of the arced leg 360' is positioned to minimize contact with the roots. This feature also serves to maximize air contact with the roots by creating a free-fall zone for the roots. In that regard, the configuration of the arc of the leg is important. If the arc projects outwardly too much, the front surface of the leg will interfere with the shoots 24 of the plant 22 (or plants) of a lower holder and impinge and/or prohibit normal growth. And, if the arc projects inwardly too much, the rear surface of the leg will contact the plant (or plants) roots of the holder and will lessen air contact at the roots. This is important because if the roots contact with the rear surface of a leg, direct contact with the surrounding air is prevented and inhibited, and when this occurs normal aspiration of the roots will be inhibited. Further, if the roots contact the rear surface of a leg, the surface area of the roots will be greatly reduced and the roots will not be able to absorb plant growth material at a normal rate. This tends to stunt plant growth.

Continuing on, the holders 340, 340', 340" and 340'" of FIGS. 10a, 10b, 10c and 10d may be combined with an insert 380. In an illustrative embodiment shown in FIGS. 11a and 11b, an insert 380 may include features such as a base 382, opposing side walls 384, 386, opposing ends 390a, 390b, and a plurality of apertures 276. As with the above-described tray 346, when the insert 380 is in use, it is generally horizontally oriented and able to receive plants. In one embodiment, the side walls 384, 386 are connected to the base 382 and extend upwardly therefrom. The opposing side walls 384, 386 and base 382 preferably serves to define an upwardly channel 388 that receives plants, but the insert can also be inverted so as to define a downwardly opening channel 388. The base 382 may include one or more apertures 276 as discussed in detail above. As will be understood, the insert 380 is configured and arranged to reside within the confines of the tray 346 of a holder 340 in a substantially nesting relation. Consequently, the dimensions of the insert 380 may vary with the range of dimensions of the tray 346 discussed above. Having said that, in a preferred embodiment, the base 382 may have a width of approximately one and three-quarter inches. The opposing side walls 384 and 386 may be angled relative to each other such that they converge at an imaginary point A2 above the insert. In a preferred embodiment, each opposing side wall 384, 386 includes an outwardly extending portion 390, 392 and an inwardly extending portion 394, 396, respectively. In a preferred embodiment, the inwardly extending portions 394, 396 define the opening of the insert channel 388. In use, the insert 380 may be positioned in a tray 346 of a holder 340 so that the side walls 384, 386 of the insert 380 are located adjacent the opposing sides 350, 352 of the tray 346. In a preferred embodiment, the apertures 276 of the insert may be aligned with the apertures 276 of a tray 346 in which it is positioned.

Figure 12:
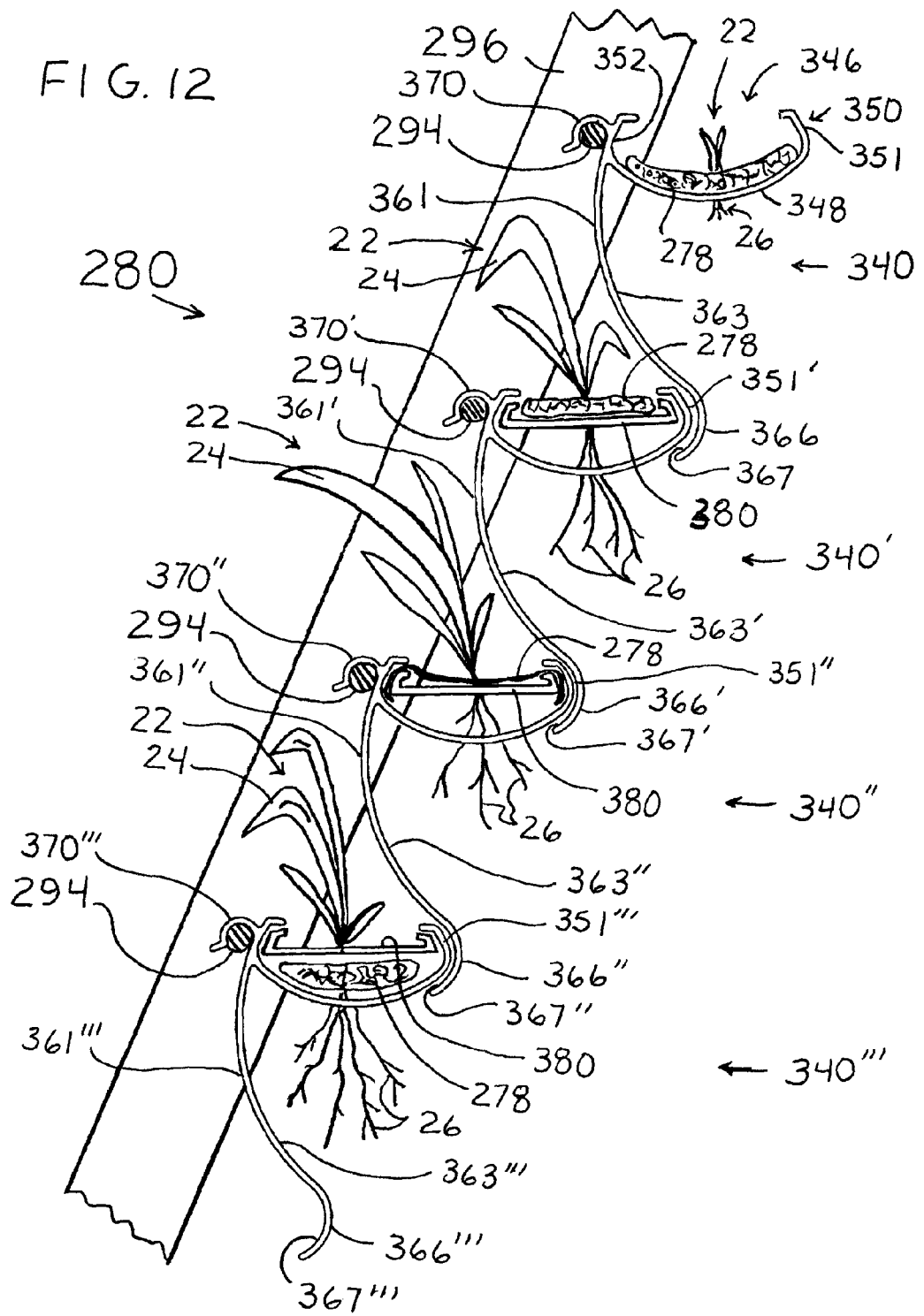
FIG. 12 is a partial, side elevational view of the plant holder of FIG. 10a and the insert of FIG. 11a as they may be used in conjunction with each other and as they may be arranged on crossbars of a plant stand frame.
Figure 13:
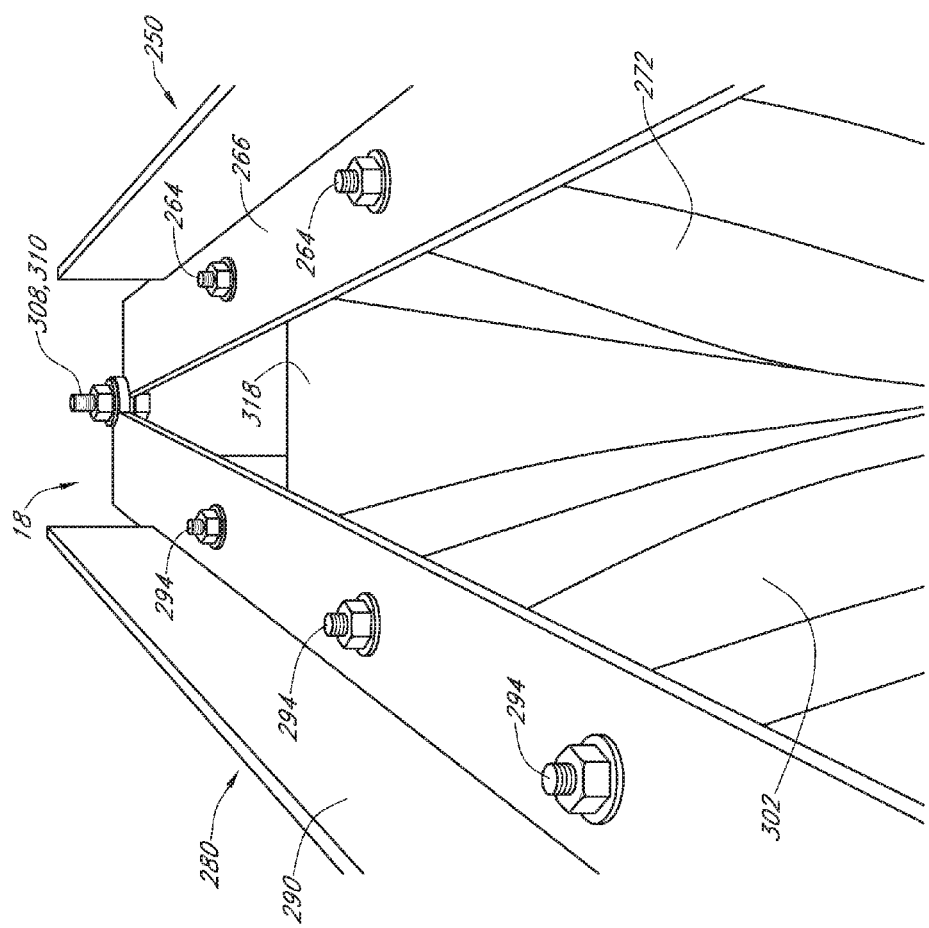
FIG. 13 is a partial, perspective end view of a portion of a plant stand with the stand including a cap that covers the top of the stand, the view looking up toward the top of the stand and into the chamber "C" of the plant stand.
Figure 14:
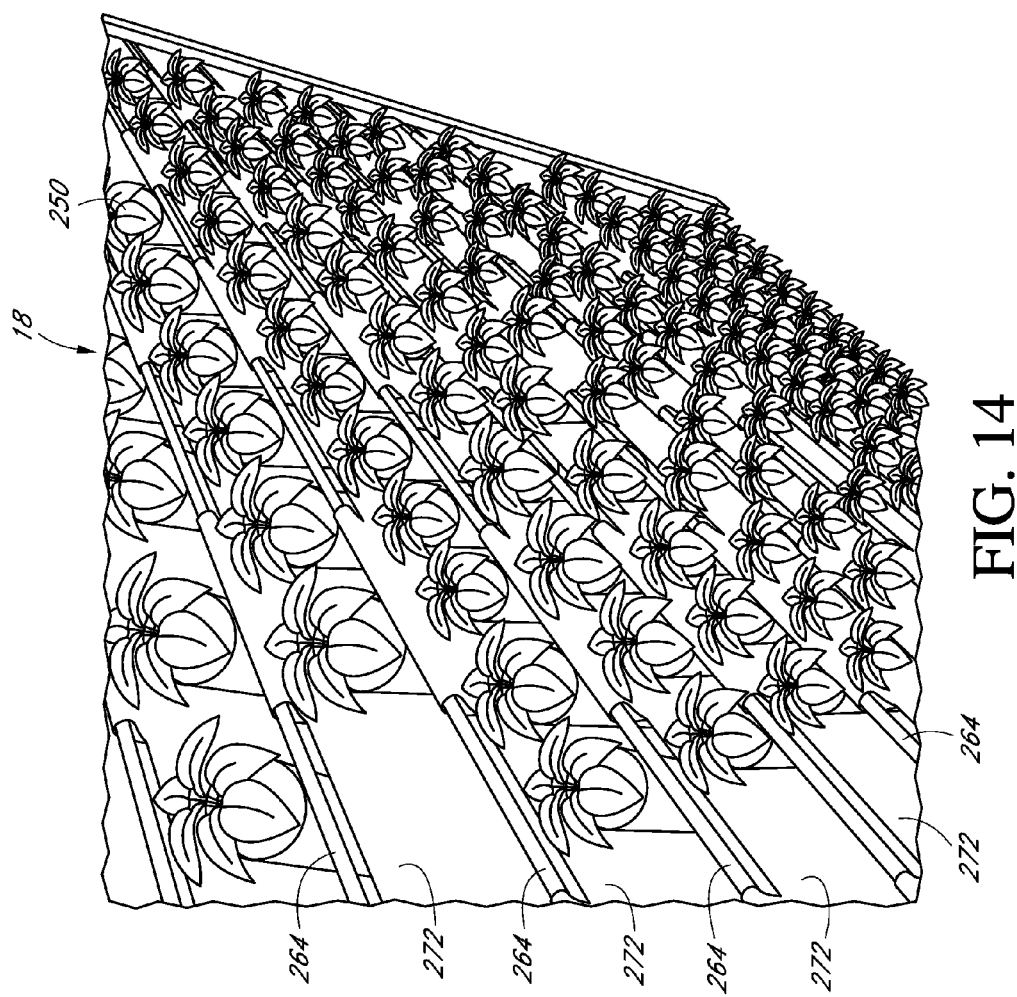
FIG. 14 is a partial, perspective view of one frame of a plant stand with the frame supporting a plurality of plants in a tiered manner, the view looking down toward the bottom of the frame.

Turning now also to FIG. 12, a partial, side elevational view depicts a plurality of holders 340, 340', 340", 340'", some with inserts 380, as they may be arranged on crossbars 294 of frame 280 of a plant stand 18. As depicted, holders 340, 340', 340", 340'" interact with each other in the manner described above. The top tier holder 340 includes the addition of a bedding material 278 and a young plant or seedling sprouting therefrom. The second tier holder 340' includes an insert 380', with bedding material 278 positioned in the insert 380' and held by the side walls 384', 386' of the insert. Note that a plant roots may extend through the apertures 276 in both the insert 380' and the tray 346' of the holder 340'. In the third tier, an insert 380" and bedding 278 are shown, with the bedding 278 held in position by the side walls 384", 386" of the insert 380" and the sides 350", 352" of the tray 346". In the fourth tier, bedding 278 is positioned between an insert 380'" and a tray 346'". Other combinations of bedding and inserts are possible without departing from the spirit and scope of the invention. The top of the plant stand 18 may be provided with a hood or cap 318 that protects plant roots by effectively reducing light and contaminants from entering the chamber from a gap that may exist between top members of two frames 250, 280 that have been connected together (FIG. 13). The hood or cap 318 may also effectively reduce the amount of nutrients and/or growth material and/or water vapor that may escape from the gap. A plant stand 18 may be provided with one or more side panels that extend between a side member of a first frame and a side member of a second frame. The side panels protect plant roots 26 by effectively reducing light and contaminants from entering the chamber from a lateral direction. In some embodiments, the side panels may extend from the top to the bottom of a plant stand. In some embodiments, a plurality of plant stands may be arranged so that side members of adjacent frames are adjacent to each other and so that the plant stands 18 may be moved together. In such instances, side panels may be provided at the ends of the chamber formed by the plant holders of the adjacent plant stands 18. In some embodiments, it may be desirable for a plant stand to be stationary and a carriage assembly move relative thereto. In such instances a side panel may be provided with a cutout to allow movement of a branch of a delivery arrangement therepast as a carriage assembly moves along the framework. As with the plant holders, the cap and side panels may be formed from opaque material plants so as to prevent light from shining on the roots of a plant. The cap and side panels may be attached to the plant stand using convention fastening elements such as hook-and loop fasteners, nuts and bolts, hooks, clips or the like.

As mentioned above, movement of one or more plant stands 18 may be supportably constrained by one or more rails 100 of a framework 12. In embodiments where the rails are U-shaped and a frame is received in a slot in the rail (as depicted in FIG. 5, for example), the bottom member of the frame 250, 280 may be provided with a friction reducing element (or elements) so that a plant stand 18 may be moved relative to the framework 12, while maintaining contact with the rails 100 of the framework 12. In some embodiments, a friction reducing element may be a wheel 258 that is rotatably mounted to the bottom member of a frame. In some embodiments, a bottom member may include a plurality of rotatably mounted wheels 258. In other embodiments the friction reducing elements may include strips of material such as polytetrafluorethylene or high molecular density plastic. Other embodiments may include friction reducing wheels and friction reducing strips. Alternatively, a rail or rails may be provided with friction reducing elements so that a plant stand may be slidingly supported thereby.

The irrigation system of the prevent invention may be provided with a recycling arrangement (not shown) that captures condensed plant growth material that has not been used by a plant and which might otherwise be discarded or wasted. The recycling arrangement may include elements such as a collector 320, a gutter, a sloped floor and a sump. In some embodiments, one or more collectors is/are positioned below rails 100 of a framework 12. In an illustrative embodiment, a collector has opposing sides that define a width that is greater than a width defined by rails of a framework, and a length that is approximately equal to a length defined by to adjacent sub-frames. The collector 320, which is formed from waterproof material, is attached to the rails 100 of a framework 12 so that it is able to capture plant growth material that may fall down from within the chamber C and from the delivery arrangement. One end of the collector 320 may be positioned so that it is higher than the other end of the collector (i.e. angled with respect to the horizontal) so that captured material may be directed toward a desired location. In an illustrative embodiment, captured material is directed towards the reservoir 180 of the delivery arrangement. A collector 320 may be removably attached to rails 100 of a framework 12 by conventional fasteners such as a resilient clip 321, or other fasteners such as hook-and-loop fasteners, wire, string, cable ties, etc. (see FIG. 8). The rails 100 of a framework 12 may also form part of a recycling arrangement. As previously mentioned, the rails 100 of a framework 12 may include upwardly opening slots 108 that may receive bottom members of one or more frames 250, 280. The slots 108 may act as gutters that may receive and capture growth material that may trickle down from the plant holders of the plant stand 18 and plant roots 26 themselves. Once the excess growth material makes its way to a slot 108, it may be directed to a desired location by providing the gutter with a slight incline. In some embodiments, a slot 108 may be provided with two inclines so as to form a low point that may be generally centrally located along a rail 100.

The irrigation system may be used to cultivate plants according to an exemplary method. Initially, a plant 22 is germinated from a seed. After a period of initial growth, it is transferred to a plant holder 272, 302, 340, which may already be attached to a frame 250 or which may be attached to the frame 250 after the plant 22 has been transferred. These steps are repeated until a frame has been filled with plants. The steps may be repeated again until a second frame 280 is filled with plants 22. The two frames 250, 280 may then be connected to each other at their top ends to form an A-frame plant stand structure. The plant stand 18 may then be moved to a framework 12 and oriented so that the wheels 259 at the bottoms of the plant stand 18 are engaged by rails 100 of the framework 12. The sides and top of the plant stand may be provided with panels and a cap to effectively close off a chamber formed by the frames. The delivery arrangement may then be activated. If there is only one plant stand, the carriage may remain stationary.

Although the descriptions of the exemplary embodiments have been quite specific, it is contemplated that various modifications could be made without deviating from the spirit and scope of the invention. Accordingly, the scope of the invention is intended to be limited by the appended claims rather than by the description of the illustrative embodiments.

The following is claimed:

1. An irrigation system comprising:
   a. a framework positioned on a flooring structure, wherein said framework includes first and second rails parallel with respect to one another, and wherein said first and second rails are configured such that they are elevated from said flooring structure via said framework;
   b. a carriage, the carriage including a body with a platform, the carriage movable between a first position and a second position in a reciprocal manner along a length of said first and second rails;
   c. a guide assembly, wherein the guide assembly is configured and arranged to constrainingly engage the carriage as it moves between the first and the second position, and wherein the guide assembly is engaged with the framework and positioned between said first and second rails thereof;
   d. a delivery arrangement, the delivery arrangement having an intake portion and a discharge portion, with the discharge portion operatively connected to the carriage, the delivery arrangement configured and arranged to conduct plant food and/or growth material from the intake portion to the discharge portion;
   e. a plant stand, the plant stand configured and arranged to retain a plant so that a plant root is able to extend downwardly, the plant stand positionable so that the plant root is able to receive growth material from the discharge portion of the delivery arrangement, and wherein said plant stand is moveable with respect to said framework in a direction that is parallel with respect to said lengths of said first and second rails.

2. The irrigation system of claim 1, wherein the discharge portion of the delivery arrangement comprises an exit port.

3. The irrigation system of claim 1, wherein the plant stand is positionable above the guide assembly.

4. The irrigation system of claim 1, wherein the carriage includes at least one friction reducing element that supports the carriage as it moves between the first and second positions.

5. The irrigation system of claim 1, wherein the plant stand is configured and arranged to support a plurality of plants in a plurality of steps or tiers.

6. The irrigation system of claim 1, wherein the plant stand defines a chamber into which the plant root extends.

7. The irrigation system of claim 1, further comprising a drive assembly, wherein the drive assembly is configured and arranged to move the carriage between the first and second positions.

8. The irrigation system of claim 7, wherein the drive assembly comprises a motive source and a flexible belt.

9. The irrigation system of claim 1, further comprising a panel that extends between a first and a second side members of said plant stand.

10. The irrigation system of claim 1 wherein said guide assembly is further defined as comprising a first guide and a second guide extending along the length of said framework.

11. An irrigation system comprising:
   a. a framework positioned on a flooring structure, wherein a portion of said framework is elevated with respect to said flooring structure, and wherein said framework includes a first rail and a second rail parallel with respect to one another;
   b. a carriage, the carriage including a body with a platform, the carriage movable between a first position and a second position in a reciprocal manner along a length of said framework, wherein said framework supports said carriage;
   c. a guide assembly, wherein the guide assembly is configured and arranged to constrainingly engage the carriage as it moves between the first and the second position, and wherein the guide assembly is engaged with the framework and positioned between said first and second rails thereof;
   d. a delivery arrangement, the delivery arrangement having an intake portion and a discharge portion, with the discharge portion operatively connected to the carriage, the delivery arrangement configured and arranged to conduct plant food and/or growth material from the intake portion to the discharge portion;
   e. a plant stand, the plant stand configured and arranged to retain a plant so that a plant root is able to extend downwardly, the plant stand positionable so that the plant root is able to receive growth material from the discharge portion of the delivery arrangement, and wherein said plant stand is moveable with respect to said framework in a direction that is parallel with respect to said length of said framework.

12. The irrigation system of claim 11 further comprising a second plant stand positioned above said plant stand.

13. The irrigation system of claim 12 wherein the plant stand is positionable above the guide assembly.

14. The irrigation system of claim 11 wherein said delivery arrangement further comprises a mast extending upward from said carriage.

15. The irrigation system of claim 11 wherein said delivery arrangement further comprises a plurality of discharge portions.

16. The irrigation system of claim 11 wherein said discharge portion is further defined as a nozzle.

17. The irrigation system of claim 11 wherein said plant stand defines a chamber into which the plant root extends, and wherein said carriage is positioned within said chamber.

18. The irrigation system of claim 11 further comprising a drive assembly, wherein the drive assembly is configured and arranged to move the carriage between the first and second positions.

19. The irrigation system of claim 11 wherein said guide assembly is further defined as comprising a first guide and a second guide extending along the length of said framework.

20. The irrigation system of claim 11 wherein said plant stand is further defined as having a bottom portion that engages said first rail.

* * * * *